United States Patent
Mitchell et al.

(10) Patent No.: US 10,676,190 B2
(45) Date of Patent: Jun. 9, 2020

(54) AUTOROTATING UNMANNED AERIAL VEHICLE SURVEYING PLATFORM

(71) Applicant: Queen's University at Kingston, Kingston (CA)

(72) Inventors: Jordan Mitchell, Toronto (CA); Joshua Marshall, Kingston (CA)

(73) Assignee: Queen's University at Kingston, Kingston, ON (CA)

( * ) Notice: Subject to any disclaimer, the term of this patent is extended or adjusted under 35 U.S.C. 154(b) by 0 days.

(21) Appl. No.: 16/046,436

(22) Filed: Jul. 26, 2018

(65) Prior Publication Data
US 2019/0031342 A1  Jan. 31, 2019

Related U.S. Application Data

(60) Provisional application No. 62/538,896, filed on Jul. 31, 2017.

(51) Int. Cl.
*B64C 39/02* (2006.01)
*G01S 17/42* (2006.01)
*G01S 17/89* (2020.01)

(52) U.S. Cl.
CPC ........... *B64C 39/024* (2013.01); *G01S 17/42* (2013.01); *G01S 17/89* (2013.01); *B64C 2201/024* (2013.01); *B64C 2201/123* (2013.01); *B64C 2201/141* (2013.01)

(58) Field of Classification Search
CPC ........ B64C 39/024; G01S 17/42; G01S 17/89

USPC ......................................................... 348/135
See application file for complete search history.

(56) References Cited

U.S. PATENT DOCUMENTS

| | | | |
|---|---|---|---|
| 3,057,589 A | 10/1962 | Nutkins et al. | |
| 3,273,834 A | 9/1966 | Bower | |
| 3,860,203 A | 1/1975 | Hyde | |
| 4,886,222 A * | 12/1989 | Burke | B64C 11/00 244/1 R |
| 2009/0272852 A1 | 11/2009 | Reynolds et al. | |
| 2018/0101169 A1* | 4/2018 | Applewhite | B64F 1/04 |
| 2019/0127067 A1* | 5/2019 | Parrello | G05D 1/102 |

OTHER PUBLICATIONS

Artieda, J., et al., "Visual 3-D SLAM from UAVs", Journal of Intelligent and Robotic Systems, vol. 55, pp. 299-321, (2009).
Brindejonc, A., "Design and Testing of an Autorotative Payload Delivery System. The Autobody", Master's thesis, Univeristy of Maryland, College Park, (2005).

(Continued)

*Primary Examiner* — Patricia I Young
(74) *Attorney, Agent, or Firm* — Stephen J. Scribner

(57) ABSTRACT

An autorotating unmanned aerial vehicle (UAV) has a data acquisition system and a rotor assembly including a hub that couples the rotor assembly to the UAV. Although not limited thereto, the UAV is suitable for collecting data about the inside of a cavity. The data acquisition system includes a processor and one or more sensors that obtain data about motion of the UAV and at least one parameter of the cavity as the UAV descends though the cavity. Features of the cavity may be mapped by generating a 3D point cloud from the data. The cavity may be natural or man-made, such as a mine.

22 Claims, 22 Drawing Sheets

(56) References Cited

OTHER PUBLICATIONS

Chen, J. et al., "Open-pit mining geomorphic feature characterisation" International Journal of Applied Earth Observation and Geoinformation, vol. 42, pp. 76-86, (2015).
Grzonka, S. et al., "A Fully Autonomous Indoor Quadrotor", IEEE Transactions on Robotics, vol. 28, No. 1, pp. 90-100, (2012).
Pounds, P. et al., "Samara: Biologically inspired self-deploying sensor networks", IEEE Potentionals, pp. 10-14, (2015).
Rudol, P., et al., "Human Body Detection and Geolocalization for UAV Search and Rescue Missions Using Color and Thermal Energy", In: Proceedings of the 2008 IEEE Aerospace Conference, pp. 1-8, (2008).
Tomic, T. et al., "Toward a Fully Autonomous UAV Research Platform for Indoor and Outdoor Urban Search and Rescue", IEEE Robotics & Automation Magazine, pp. 46-56, (2012).

\* cited by examiner

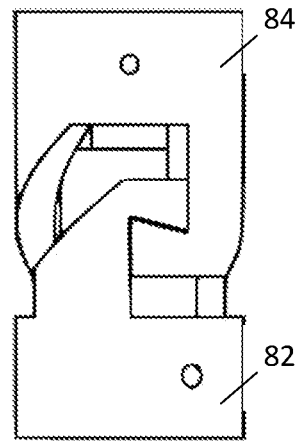 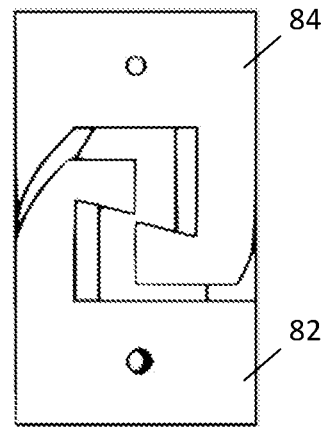
Fig. 8A　　　　Fig. 8B
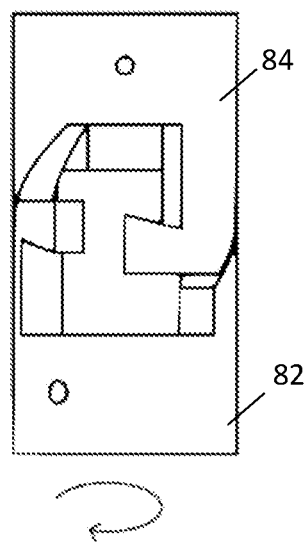 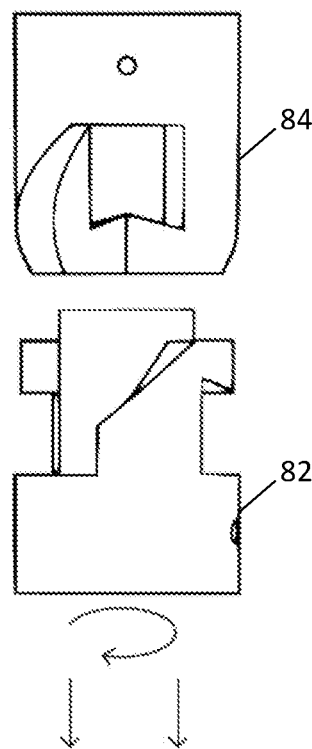
Fig. 8C　　　　Fig. 8D

AUTOROTATING UNMANNED AERIAL VEHICLE SURVEYING PLATFORM

RELATED APPLICATION

This application claims the benefit of the filing date of Application No. 62/538,896, filed 31 Jul. 2017, the contents of which are incorporated herein by reference in their entirety.

FIELD

This invention relates generally to mobile sensing devices using unmanned aerial vehicles. More specifically, the invention relates to autorotating unmanned aerial vehicles for autonomous sensing, surveying, and mapping of cavity interiors, and methods therefor.

BACKGROUND

Unmanned aerial vehicles (UAVs) are gaining interest in diverse applications to assist in everyday activities and operations. Above ground, UAVs are in some cases a more efficient, less expensive, and safer alternative to manned aircrafts currently used for photography, inspection and security. For example, by attaching camera, infrared, and/or LiDAR payloads, UAVs can provide a low-cost method of obtaining highly accurate 3D data and aerial photography. For example, UAVs are now commonly used in open pit mining operations for applications that include stockpile surveying, 3D pit modelling, facilities management, accident reporting, progress monitoring, and environmental assessment [8]. In mining, UAVs may add value to daily operations, in applications such as pre- and post-blast monitoring in order to identify the presence of misfires and wall damage and to reconcile the blast results with expected results; a UAV equipped with a magnetometer may be used for mineral exploration surveys; and UAV surveys may be used for solids modelling at tailings dams and stability monitoring [8].

In mining applications, UAVs have so far been mostly limited to surface applications. Harsh underground environments pose many obstacles for flying UAVs. The confined space, dampness, reduced visibility, air movement, and lack of control signal propagation hinders most operators from being able to fly a drone underground. It may be that truly practical uses for UAVs underground will require either autonomous or semi-autonomous flight capabilities. Although there are many difficulties with flying underground, the potential benefits from a working system could greatly improve mining and surveying operations. The potential benefits of deploying UAV platforms underground include access to unreachable and dangerous locations and aid in rescue operations. These benefits have the potential to greatly improve mine monitoring and mine safety. Research has shown that current UAV technologies exist that allow for autonomous indoor flight. Extensive research has been done to develop UAV systems that are capable of performing on-board simultaneous localization and mapping (SLAM), which can allow them to navigate and map a foreign environment autonomously [1, 5]. Grzonka [5] successfully used an open hardware quadrotor to autonomously navigate and map an office building. The research outlines the localization, mapping, path planning, height estimation and control of the autonomous quadrotor. Other research has been done that exploits autonomous UAVs for search and rescue. Kassecker [7] proposed a software and hardware framework for a quadrotor capable of indoor and outdoor urban search and rescue and Rudol [11] developed a system for human body detection and geolocalization using an autonomous UAV. The use of autonomous UAVs in search and rescue has the potential to improve situational awareness and surveillance for a rescue team.

A significant problem with implementing these methods in underground mines is that current UAV hardware may not be capable of withstanding harsh underground environments, line-of-sight visibility and direct communications are highly limited, and there are additional underground constraints that may pose additional challenges.

SUMMARY

According to one aspect of the invention there is provided an autorotating unmanned aerial vehicle (UAV), comprising; a payload housing that houses a data acquisition system (DAQ); a rotor assembly including two or more rotors and a hub that couples the rotor assembly to the payload housing; wherein each rotor of the two or more rotors has a fixed rotor pitch; wherein the DAQ includes one or more sensors that obtain data about motion of the UAV and at least one parameter of a cavity as the UAV descends though the cavity.

In one embodiment, at least one sensor obtains data about range to a surrounding structure in the cavity. In another embodiment, the one or more sensors obtain data about position and angular rate of rotation of the UAV, and range to a surrounding structure.

In one embodiment, the range to a surrounding structure is used to determine at least one feature of the cavity selected from surface roughness, excavation volume estimation, rock mass stability, ventilation modelling, stope reconciliation, and convergence monitoring.

The least one parameter may be at least one environmental parameter of the cavity.

In one embodiment, the hub includes a gimbal that provides the rotor assembly with a selected range of tilt freely along roll and pitch axes of the UAV to improve stability of the UAV during descent. According to embodiments, as the UAV descends and rotates, the one or more sensors perform an approximately helical scan inside the cavity.

In one embodiment, the at least one sensor that obtains data about range to a surrounding structure in the cavity comprises a light detection and ranging (LiDAR) system.

In one embodiment, the data include vertical position data, angular orientation data, and range data.

In one embodiment, the DAQ includes a transmitter for wirelessly transmitting the data.

In one embodiment, the one or more sensors comprise at least one of an image capture device, a thermal (infra-red) sensor, an ultra-violet (UV) sensor, an ultrasound (US) sensor, a visible light sensor, a radiation sensor, an air quality sensor, an oxygen sensor, a carbon dioxide sensor, a carbon monoxide sensor, and a chemical sensor that senses at least one chemical of interest, such as natural gas.

According to another aspect of the invention there is provided a method for mapping one or more parameters of a cavity, comprising: deploying a UAV in the cavity, wherein the UAV comprises a data acquisition system (DAQ) including one or more sensors that obtain data about motion of the UAV and at least one parameter of the cavity as the UAV descends though the cavity; using a processor to process the data and construct a 3D point cloud of the one or more parameter; and generating a map of the one or more parameter of the cavity from the 3D point cloud.

In one embodiment, generating a map includes subjecting the 3D point cloud data to one or more of filtering outlier range measurements, a closed loop mapping algorithm, an open loop mapping algorithm, a simultaneous localization and mapping (SLAM) algorithm, and combining sensor information for more accurate position estimates.

In one embodiment, the range to a surrounding structure is used to determine at least one feature of the cavity selected from cavity volume, surface roughness, excavation volume estimation, rock mass stability, ventilation modelling, stope reconciliation, and convergence monitoring.

According to another aspect of the invention there is provided an autorotating unmanned aerial vehicle (UAV), comprising; a payload housing that houses a data acquisition system (DAQ); a rotor assembly including a hub that couples the rotor assembly to the payload housing such that the payload housing is suspended below the rotor assembly; wherein the DAQ includes a processor and sensors for recording position, orientation, and range data as the UAV descends substantially vertically though a cavity.

In one embodiment, the hub includes a gimbal that provides the rotors with a selected range of tilt freely along roll and pitch axes to improve stability of the UAV device during descent, and to ensure that the payload is suspended substantially vertically during descent.

According to another aspect of the invention there is provided a method for mapping inside surfaces of a cavity, comprising: deploying a UAV as described herein in the cavity; obtaining vertical, horizontal, and angular position data and range data collected by the UAV during a substantially vertical descent though the cavity; using a processor, processing the vertical, horizontal, and angular position data and the range data to construct a 3D point cloud; and generating a map of the inside surfaces of the cavity from the 3D point cloud.

In one embodiment, the method further comprises using the map to estimate the cavity volume, analyze underground blast results in a mine stope, and/or detect features of interest.

According to the aspects and embodiments, the cavity may be below ground, above ground, natural, or man-made. The cavity may be associated with a mine.

BRIEF DESCRIPTION OF THE DRAWINGS

For a greater understanding of the invention, and to show more clearly how it may be carried into effect, embodiments will be described, by way of example, with reference to the accompanying drawings, wherein:

FIGS. 8A-8E are drawings of a clutch for a spin release mechanism, according to one embodiment.

DETAILED DESCRIPTION OF EMBODIMENTS

Described herein is an autorotating UAV platform adapted for 3D data collection (e.g., imaging, 3D mapping, etc.) of a space, cavity, etc., in which it is deployed. Embodiments are well-suited for deployment in underground spaces such as mines, as they may be able to access locations within a mine that are normally inaccessible, including ore passes, stopes, ventilation raises, and hazardous areas. Applications for underground UAVs may include mine surveying and search and rescue. A UAV equipped with one or more sensors such as, for example, a LiDAR, or a time-of-flight (ToF) payload may be capable of descending into hazardous areas and gathering survey data as well as other data. This data can be processed to analyze and improve mining operations, to locate specific features or individuals requiring rescue, and to characterize environmental and/or other conditions in the cavity. Such applications may include, but are not limited to:

Surface roughness mapping;
Excavation volume estimation;
Rock mass stability analysis;
Ventilation modelling;
Stope reconciliation; and
Convergence monitoring.

Figure 1:
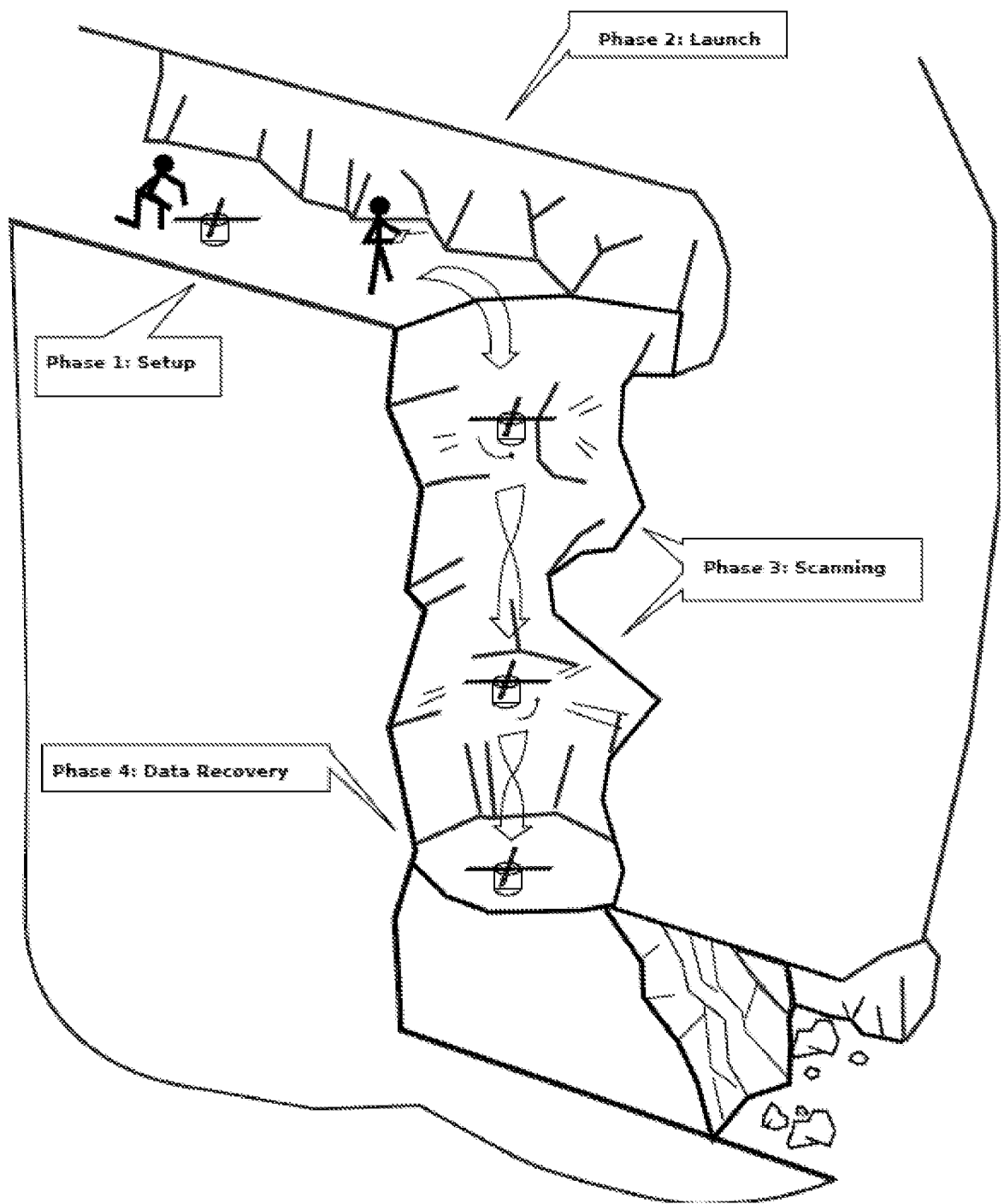
FIG. 1 shows a visualization of 3D scanning of a vertical excavation by using an autorotating UAV.

A 3D scanning UAV platform may also be used for abandoned mine exploration and monitoring of shaft development. A UAV may improve surveying by providing multiple viewpoints (improved survey accuracy) and reduce survey time. FIG. 1 shows a visualization of the 3D scanning of a vertical excavation (i.e., a cavity) by using a UAV. In the example of FIG. 1, an operator brings a UAV to the scan site, switches on the on-board data acquisition system and completes any other requirements to prepare the UAV for deployment (Phase 1). At Phase 2, the UAV is deployed in the cavity. At Phase 3, the UAV descends through the cavity in autorotating flight, scanning the cavity walls, under occlusions, etc, such that a helix of data (e.g., range data) is collected. The UAV lands at the bottom of the cavity (Phase 4), at which point the scan data is collected. Scan data may also be collected as the UAV descends into the cavity.

UAVs may also enhance and expedite mine rescue operations by improving situational awareness, reducing response time, and removing the mine rescue team from hazardous situations. For example, during unfavourable conditions, when the mine rescue team is unable to enter the mine, a UAV may be used to enter the mine, conduct air quality tests and provide live video feedback. Whereas land robots may fail due to obstructions and/or contact with water, a flying device may be more suitable to enter a mine during a rescue effort.

Although this description focusses primarily on mining applications, it will be appreciated that embodiments are also suitable or adaptable for deployment above ground, within natural spaces such as crevices and caves, and man-made spaces such as within buildings or other structures. For the purpose of this disclosure, such a cavity, stope, void, etc. whether below ground, above ground, natural, or man-made, is generally referred to herein as a "cavity".

One embodiment relates to a low-cost UAV that generates a 3D scan of a mine stope or other vertical underground cavity (e.g., see FIG. 1). Current methods for cavity scanning and monitoring use a large boom and a rotating LiDAR sensor to collect a 3D point cloud. Examples include the Maptek™ I-Site 8200 laser scanner (Maptek/KRJA Systems Inc., Golden, Colo., USA) and the Renishaw® Void Scanner 150 (Renishaw PLC, Gloucestershire, UK). Disadvantages of these methods include long surveying times and reduced scan accuracy due to a single point of view. Also, such systems are often very expensive.

However, according to embodiments described herein, a UAV platform with a range sensor (i.e., a sensor that senses distance to a nearby structure, such as a LiDAR) provides a more complete and faster surveying tool, depending on the purpose and accuracy required. Further, scan coverage is improved by flying the range sensor within the cavity. In one embodiment, the range sensor may sense distance laterally (i.e., substantially horizontally) from the UAV. This ensures that structures such as rock outcroppings and overhangs will not obstruct data collection, and instead are mapped as the UAV descends into the cavity. This is depicted in FIG. 1. A UAV may also be able to collect a scan with a more even point distribution throughout the cavity. Scans using a stationary scanner at the top of the cavity show a high point density near the top and a low point density at the bottom. This is due to the proximity of the laser sensor being closer to the top of the cavity than the bottom, and the singular perspective. Also, because a UAV platform as described herein may be significantly less expensive than prior devices, it may be suitable for single-use (e.g., disposable) applications, such as for scanning a cavity (and collecting data) where retrieval of the UAV may be impossible.

A primary objective of one embodiment described herein is to provide a UAV-based tool (i.e., an "UAV device") capable of collecting 3D point cloud data representing a cavity, wherein the data can be analyzed to reliably produce a volume estimate of the cavity. Features of the UAV device may include;

less expensive than current stationary scanning devices;
  may be disposable after a single use;
  capable of fully autonomous flight (i.e., no (remote) human pilot);
  collect 3D data along the vertical extent of a cavity; and,
  collected data is useful for computing a reasonable cavity volume estimate.

These features result in the UAV device being more effective than current cavity surveying methods and equipment.

Autorotating UAV Design

An autorotating UAV significantly reduces cost and simplifies flight automation, relative to vertical take-off and land (VTOL) devices such as quadcopters. Autorotation is the state of flight where a main rotor system spins with no net power requirement; the rotor spins due to the flow of air through the rotor as it descends through the air under the influence of gravity. Thus, it will be appreciated that the term "flight" as used herein refers to unpowered (i.e., passive) autonomous descent of the UAV. Autorotation is used to control characteristics of the UAV flight, such as descent speed and stability. Upon reaching equilibrium, a UAV in autorotation is inherently stable and falls with a constant descent speed and angular velocity. Utilizing this phenomenon allows the cost of the device to be reduced greatly because the device itself can be used to rotate a low-cost payload including one or more sensors and no on-board power system is required to power and control the flight. Thus, a UAV as described herein is designed to have desired flight characteristics, such as descent speed and angular velocity, at equilibrium. As described below, features of the UAV are selected to achieve the desired flight characteristics.

Previous work on autorotating devices has focused on payload delivery [2, 10] and sensor deployment [3, 9] from high altitudes in outdoor environments without physical restrictions on the lateral space available and with substantial vertical distance available for descending flight. One such design [10] was modelled after a samara. In another [3], an autorotating single-winged apparatus was proposed in which an on-board image sensor capable of capturing images of the ground rotated as the apparatus descended through the atmosphere [3]. Thus, previous work did not consider design parameters for controlled flight in constrained spaces such as cavities. Further, previous work did not consider design parameters for controlled flight to enable data collection by laterally-directed sensors such as range sensors (e.g., range sensors directed toward cavity walls). In addition, designs having only a single rotor may inherently take longer to reach equilibrium (i.e., stable autorotating flight) and thus are not suitable for use within the limited space of a cavity where the ability to quickly establish equilibrium is critical due to the typically shorter vertical distance of a cavity relative to an outdoor environment. In [2], a pitch flap coupling was to change the initial rotor pitch during flight, in an attempt to allow the device to self-adjust pitch to achieve equilibrium. However, such a design may also require considerable flight time to reach equilibrium. Clearly none of the previous autorotating devices is suitable for an application as described herein, due to shortcomings in one or more of flight (descent) stability, predictability, and payload capability. For example, design for flight stability and a predictable flight pattern is essential for deployment in constrained spaces such as cavities. Further, these requirements are important for accurate data collection from onboard sensors, and to enable the subsequent merger of collected data for the purposes of creating an accurate map of the cavity.

Figure 2:
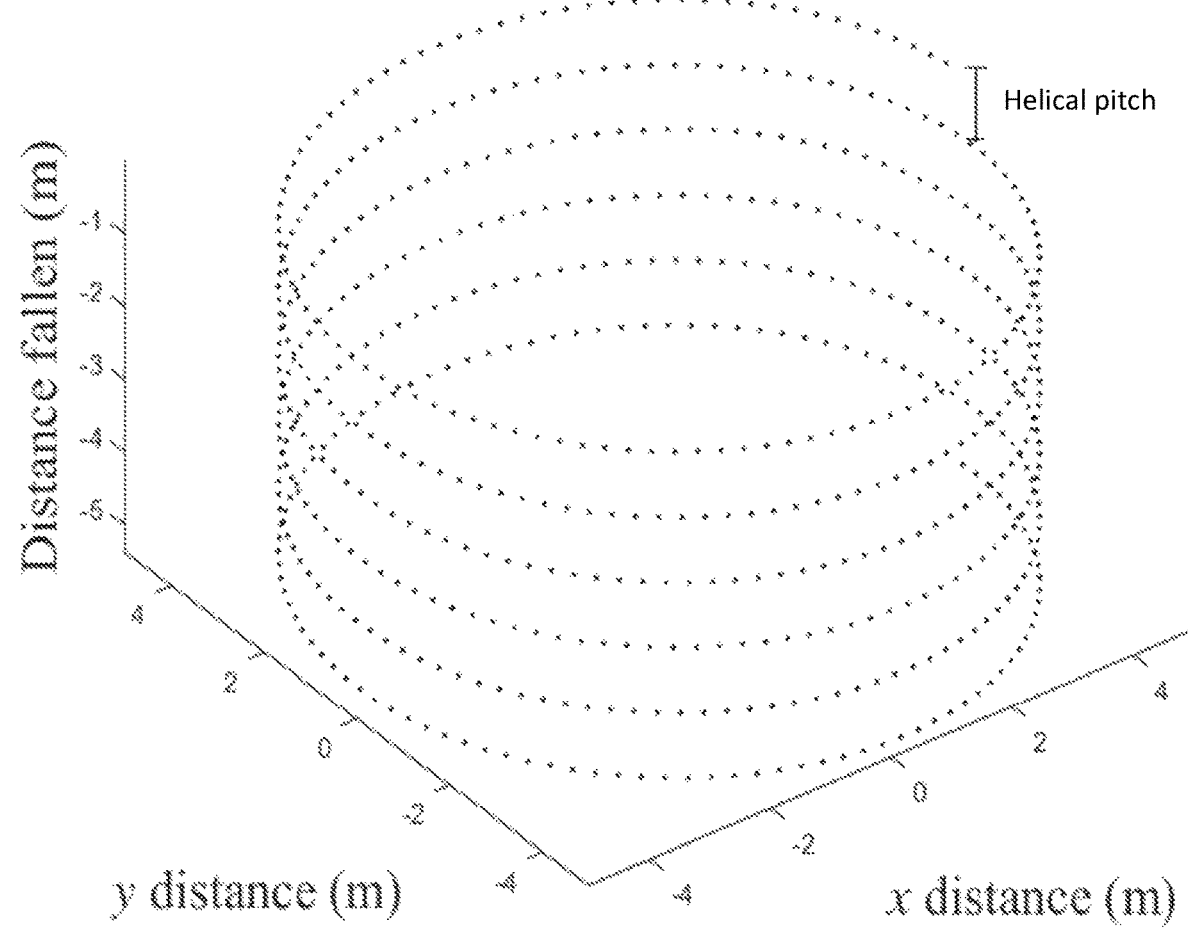
FIG. 2 is a diagram showing an example of a helical scan pattern.

As described herein, a 3D point cloud of a cavity may be reconstructed by placing a low-cost range sensor such as a LiDAR (e.g., a single-beam rangefinder) payload on an autorotating UAV device. As the device descends and rotates, a horizontal laser sensor collects distance measurements resulting in an approximately helical scan of the cavity. An example of a scan pattern is shown in FIG. 2. By knowing the stable descent speed and rotation rate of the device (inherent in the design), the position and orientation of the sensor payload may be estimated. By using the vertical and angular position of the autorotative device and the distance to the cavity wall, a 3D map of the cavity may be reconstructed. This map may be used, for example, to estimate the cavity volume, analyze underground blast results in a mine stope, and/or detect features of interest.

Utilizing an autorotating UAV device to rotate a sensor payload such as a LiDAR sensor and/or other sensors, an image capture device such as a camera, etc.) as it descends through a cavity permits simple deployment and operation. An operator merely has to position the UAV device at the opening of the cavity, release the UAV device, and allow the device to collect the data as it falls. In some embodiments, deployment may require spinning the UAV device to a selected angular velocity prior to release, so as to prevent or minimize any initial free-fall (prior to proper autorotation) in the descent, thereby allowing the UAV to reach equilibrium substantially immediately. A spin release mechanism, such as that described below, may be provided for this purpose. Other embodiments begin autorotating descent substantially immediately upon release, and do not require a spin release mechanism. In one embodiment, the UAV device is disposable, for use in situations wherein the UAV device is not recoverable from the cavity.

Other types of sensors may be included in the payload. For example, other sensors may be employed to detect or measure one or more of heat (infra-red), ultra-violet (UV), ultrasound (US), radiation, temperature, air quality, oxygen, carbon dioxide, carbon monoxide, and one or more chemicals of interest (e.g., natural gas, other gases)

Aerodynamic Design

Figure 3:
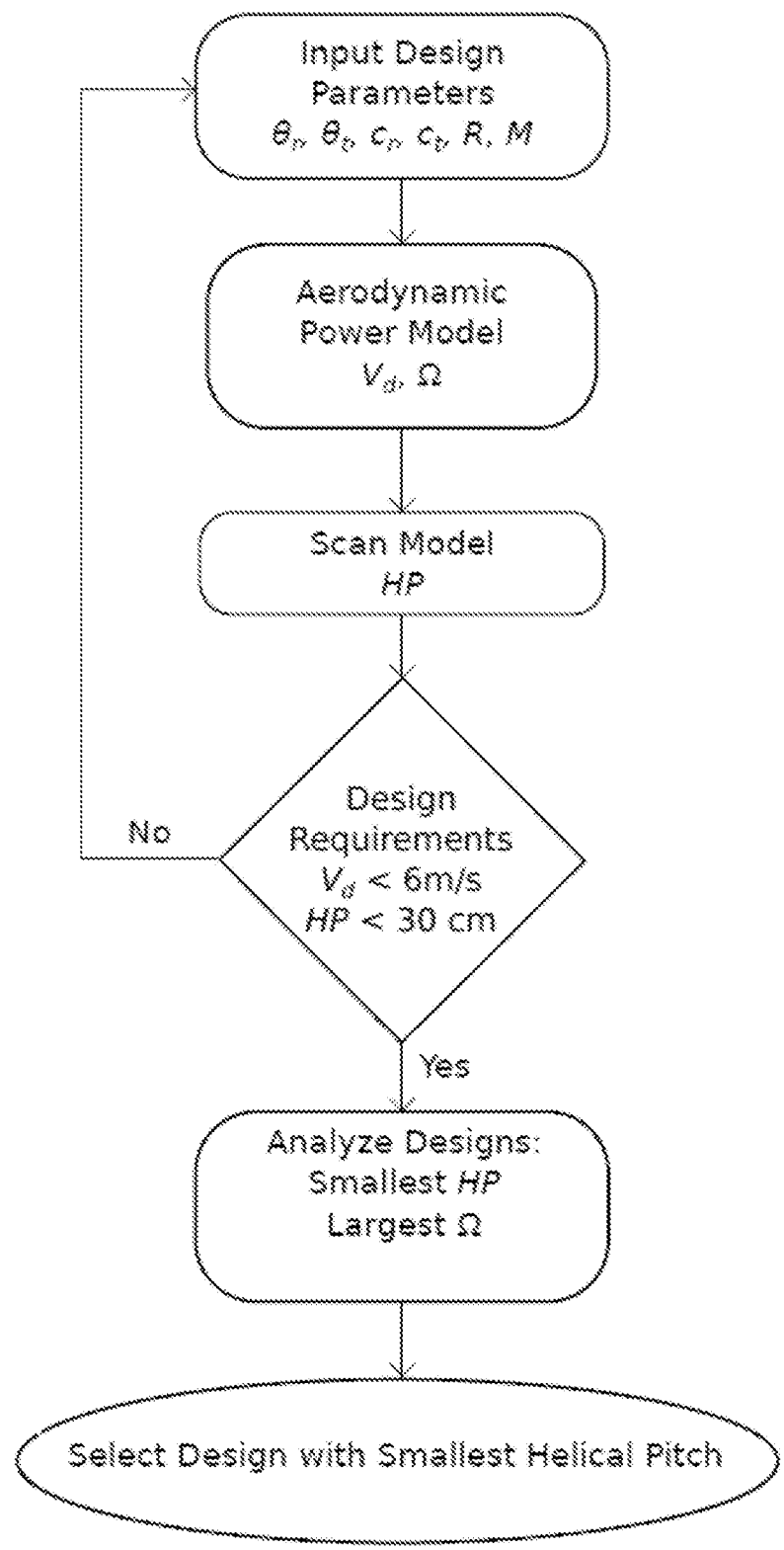
FIG. 3 is a flow chart showing a design optimization process, according to an embodiment.

The aerodynamic design of the UAV refers to the design of the rotors (i.e., airfoils) that results in a specific helical scan pattern. The helical scan pattern recorded using a LiDAR and/or other sensor payload is characterized by the helical pitch and the number of data points per rotation. Assuming a constant LiDAR sensor update rate, the helical pitch and number of points per rotation are directly related to the descent and angular velocity of the device. An aerodynamic model was created to analyze the design parameters and output the descent velocity and angular velocity of the device as it falls. The aerodynamic model output was then used to create a corresponding helical pattern. A brute force iterative search was used to cycle through numerous combinations of design parameters. The design parameters resulting in a chosen (desired) helical pattern were selected for construction of a prototype. FIG. 3 depicts a flowchart for an analysis for determining design parameters that correspond to a particular desired UAV descent behaviour and, thus, helical scan pattern, according to one embodiment. As shown in FIG. 3, combinations of design parameters (rotor radius, mass, rotor pitch angle, and chord length) were the inputs to an aerodynamic model that utilizes momentum theory and blade element theory to calculate the descent speed and angular velocity during descent. The resulting descent speed and angular velocity was used to model the helical scan pattern expected from that combination of design parameters. The design parameters expected to create the most favourable helical scan pattern were selected. For example, as shown in FIG. 3, the design that produces the smallest helical pitch may be selected.

It will be appreciated that other aerodynamic designs may be used to achieve other scan patterns. For example, it may be desirable to introduce a wobble into the scan pattern to acquire more/different data. It also will be appreciated that parameters of the aerodynamic design described herein are exemplary, and design parameters may be altered, scaled, adjusted, etc., to achieve other design criteria. For example, the number of rotors may be varied according to the desired flight characteristics. Where only crude measurements of a cavity and/or simple sensor data are required, or where a cavity is very large, flight stability may not be critical and therefore it may be possible to use a UAV with only two rotors. However, as flight stability becomes more important, and/or a slower descent is desirable, a UAV with three, four, five, or more rotors may be required.

Another aspect of the invention relates to the use of multiple UAVs in a cavity. For example, two or more UAVs may be deployed substantially simultaneously or sequentially in a cavity. In one embodiment the two or more UAVs may be equipped with the same or substantially the same sensors, where sequential deployment may be beneficial in, for example, acquiring environmental data in a rapidly changing environment and/or in applications where there is a high probability that a UAV may be destroyed or rendered inoperable during its descent. In one embodiment the two or more UAVs may be equipped with different sensors. In one embodiment the UAVs may be "miniature", i.e., small, inexpensive UAVs having, for example, only a simple sensor configuration (e.g., for sensing one or a small number of parameters). In one embodiment the UAVs may be capable of communicating with each other; for example, to identify their relative positions within the cavity and/or to optimize thoroughness of data collection.

Aerodynamic Model

The design parameters that were selected as part of the design process (FIG. 3) include:
UAV mass (M);
Rotor spanwise length, or radius (R);
Rotor chord length (ctip or $c_t$, croot or $c_r$);
Rotor pitch angle along blade (θtip or $\theta_t$, θroot or $\theta_r$); and
Rotor 2D cross sectional shape.

These parameters were the inputs to the aerodynamic model, which computed the flight characteristics of the device during autorotation. These characteristics include:
Descent velocity ($V_d$);
Angular velocity (Ω); and
Helical pitch (HP).

The aerodynamic model used the principle that the power delivered to the device by air flowing through it is equal to the power extracted by the device causing it to rotate. The sum of the rotors' induced power and profile power is zero in autorotative descent, thus $$C_p = C_{pi} + C_{po} = 0, \quad (1)$$

where Cp is the dimensionless coefficient of power, $C_{pi}$ is the induced power loss (energy transferred from the rotor to the air), and $C_{po}$ is the profile loss (losses due to drag of the rotor blades in a viscous fluid). The values for $C_{pi}$ and $C_{po}$ may be derived in terms of the selected design parameters. This derivation requires Blade Element Momentum Theory (BEMT) as described in [6]. The accuracy of the model has been justified by comparing the modelled results to the physical results presented by Brindejonc [2]. Brindejonc designed and tested an autorotative delivery system (called the Autobody) that starts from rest and is dropped from a hot air balloon. The Autobody reduces the descent speed of the package and ensures a low impact landing. This comparison is not exact because not all of the design parameters for each of the physical tests can be determined. However, Brindejonc provides the radius, mass, chord length and blade twist for each of the physical tests. In Brindejonc the physical tests used a pitch flap coupling to change the initial rotor pitch during flight, which makes estimating the initial pitch difficult. In contrast, the model used a fixed rotor pitch. Table 1 shows the comparison of the physical results and model results. The power model estimates the angular velocity to within 10% and the descent velocity to within 25% of the physical tests.

TABLE 1

Model results compared to physical tests.

| Design Parameters | | | | | | Physical Test | | Power Model | |
|---|---|---|---|---|---|---|---|---|---|
| Mass (kg) | Radius (m) | Tip Pitch (rad) | Root Pitch (rad) | Tip Chord (m) | Root Chord (m) | Descent Velocity (m/s) | Angular Velocity (rad/s) | Descent Velocity (m/s) | Angular Velocity (rad/s) |
| 1.10 | 0.508 | 0.03 | −0.1 | 0.0762 | 0.076 | 5.7 | 80.84 | 4.33 | 73.9 |
| 1.01 | 0.508 | 0.047 | −0.087 | 0.0762 | 0.076 | 5.4 | 73.3 | 4.27 | 66.21 |
| 1.11 | 0.508 | 0.1 | −0.03 | 0.0762 | 0.076 | 4.11 | 57 | 4.2 | 54 |

Aerodynamic Model Results

Figure 4:
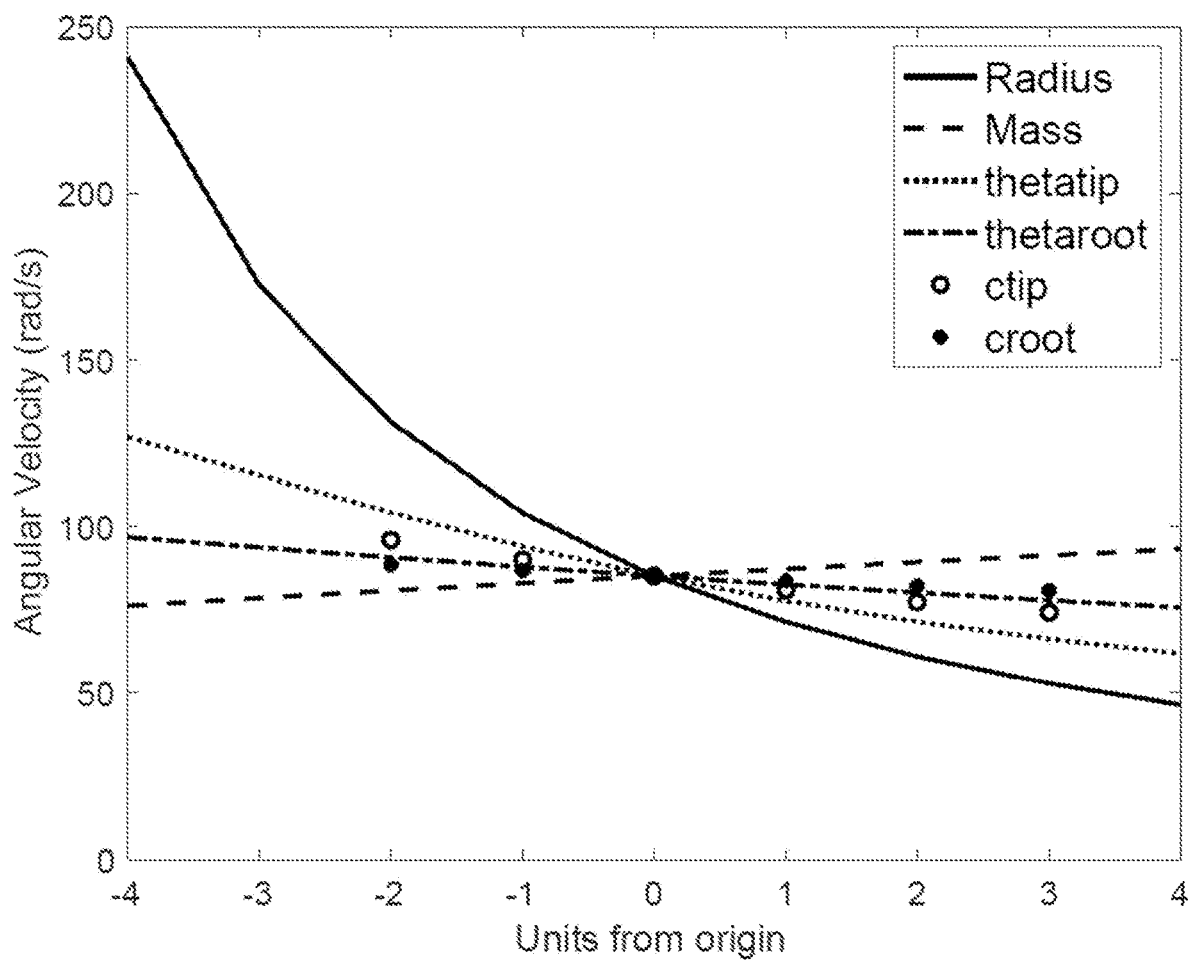
FIG. 4 is a plot showing input parameter influences on angular velocity during autorotation.
Figure 5:
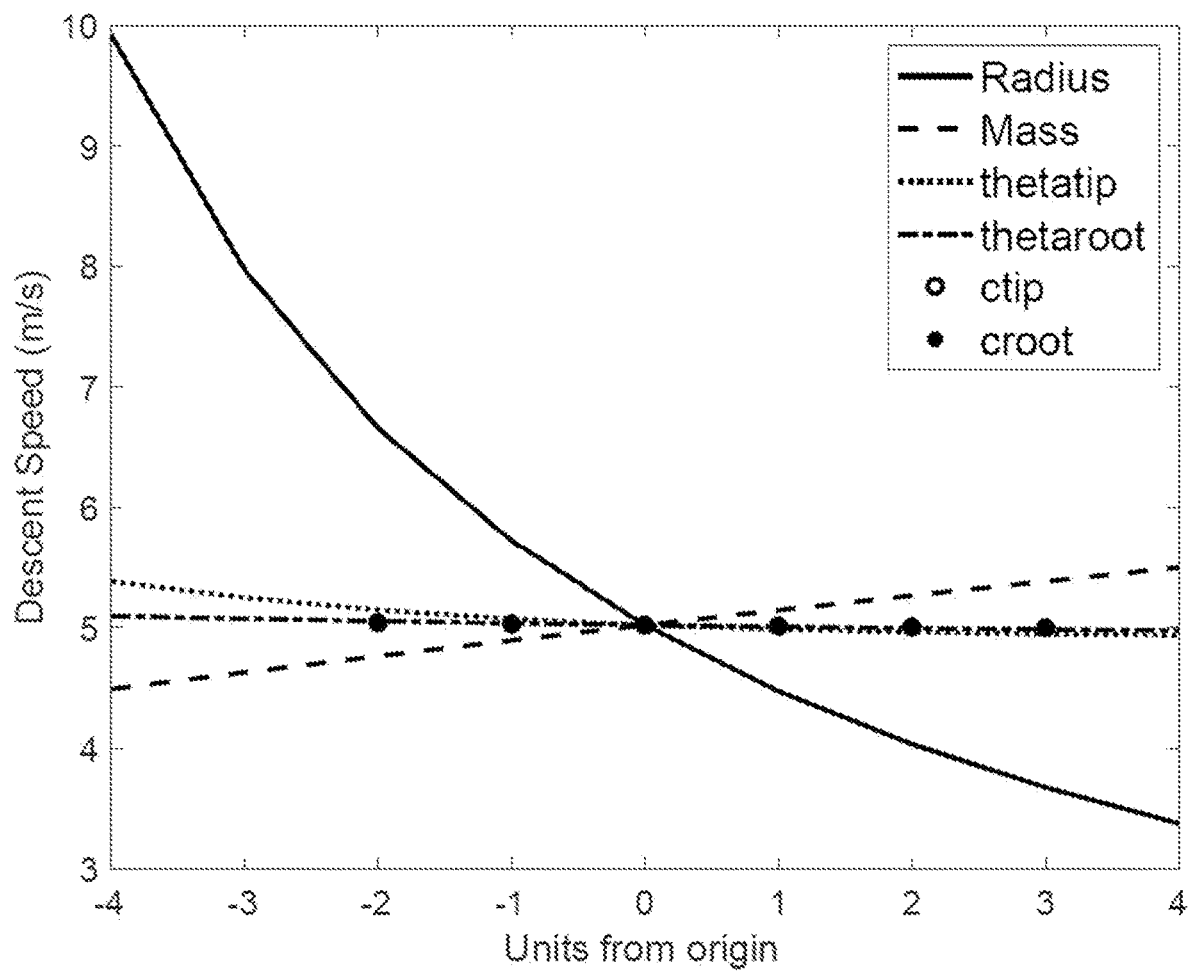
FIG. 5 is a plot showing input parameter influences on descent velocity during autorotation.

An aerodynamic model was developed and used to determine how each design parameter affected the descent velocity and angular rate during autorotation. This was done by selecting a control design, arbitrary set of parameters, and varying each design parameter independently to determine its effect. The estimated influence each parameter has on angular velocity is shown in FIG. 4 and the influence on descent velocity is shown in FIG. 5. These results show that there is a tradeoff between angular velocity and descent velocity. That is, a design that falls quickly will spin fast and a design that falls slowly will spin slowly. The ideal scanning device would fall slowly, so as to image as much of the cavity as possible, and spin fast in order to collect enough data points. The modelling results show that this is not possible for an autorotating device and that a compromise must be made between angular rate and descent velocity.

Parameter Selection

In the design optimization a simple brute force search was conducted to evaluate a large number of parameter combinations in order to predict their flight performance. It was determined that "favourable" flight characteristics are those with:

A descent speed less than 6 m/s; and,
A helical pitch less than 30 cm.

These were selected so as to obtain an acceptable scan pattern in an average undergound open cavity, with affordable sensors. If acceptable flight characteristics resulted from a certain combination of input parameters, that design was stored in a list of potential designs. The list of successful designs was then sorted for a design with the smallest helical pitch. The optimization output can be seen in Table 2. The selected power model concludes that the design should include the parameters provided in Table 3. This design was shown to generate the smallest helical pitch and a favourable helical scan pattern.

TABLE 3

Model-based UAV design parameters.

| Number of rotors | 4 |
|---|---|
| Radius | 0.4 m |
| Mass | 0.9 kg |
| Tip pitch | −0.06 rad |
| Root pitch | 0 rad |
| Tip chord | 0.04 m |
| Root chord | 0.05 m |

Embodiments will be further described by way of the following non-limiting Examples.

EXAMPLE 1

Prototype Construction

Figure 6:
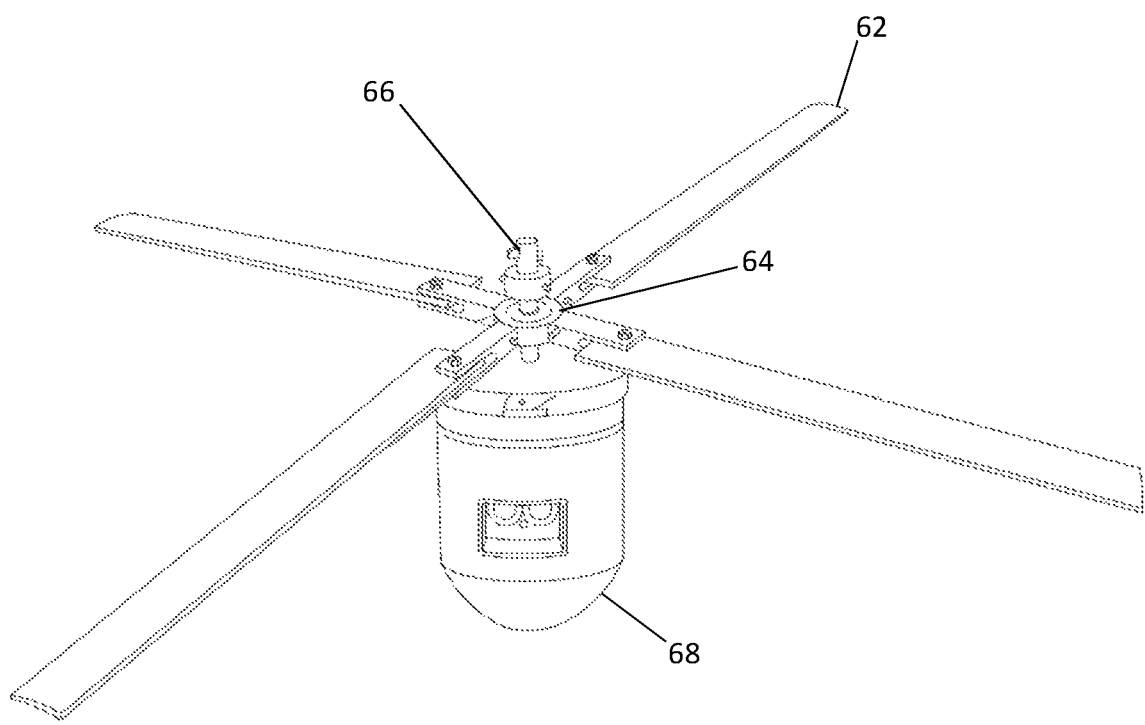
FIG. 6 is a drawing of a fully assembled UAV prototype.

A prototype included three main components: the rotor assembly 62 (i.e., custom airfoil and gimbal hub 64), a spin release mechanism 66 with motor connection, and the sesnor payload 68. The rotor assembly is used to control flight and the payload is responsible for collecting position and range data. The prototype is designed to be modular so that individual parts can be easily replaced or modified. A drawing of the fully assembled prototype is provided in FIG. 6.

Rotor Assembly

The rotor assembly included four custom-made rotors attached to a custom-built gimbal hub using a custom-designed clamp. To reduce the mass of the UAV device, the rotors were made of carbon fibre and the hub was made out of aluminum. Each rotor was constructed from 3K twill carbon fibre weave and 31-IGF rohacell foam core. An aluminum mould was built and used to shape the rotors to the optimal design. The mass of each rotor was about 30 g.

TABLE 2

Design optimization search output.

| Design Parameters | | | | | | Physical Test | | | |
|---|---|---|---|---|---|---|---|---|---|
| Mass (kg) | Radius (m) | Tip Pitch (rad) | Root Pitch (rad) | Tip Chord (m) | Root Chord (m) | Descent Velocity (m/s) | Angular Velocity (rad/s) | Helical Pitch (m) | |
| 0.9 | 0.4 | −0.06 | 0 | 0.04 | 0.05 | 5.4 | 158 | 0.21 | Smallest |
| 0.9 | 0.4 | −0.04 | −0.06 | 0.04 | 0.06 | 5.3 | 154 | 0.21 | Pitch |
| 0.9 | 0.4 | −0.06 | −0.06 | 0.04 | 0.05 | 5.2 | 148 | 0.22 | |
| 0.9 | 0.4 | −0.06 | 0 | 0.04 | 0.05 | 5.4 | 158 | 0.21 | Largest |
| 0.9 | 0.4 | −0.06 | −0.04 | 0.05 | 0.05 | 5.5 | 155 | 0.22 | Omega |
| 0.9 | 0.4 | −0.04 | −0.06 | 0.04 | 0.06 | 5.4 | 155 | 0.22 | |
| 0.9 | 0.5 | −0.02 | 0.08 | 0.04 | 0.05 | 4 | 83 | 0.3 | Slowest |
| 0.9 | 0.5 | 0.02 | −0.04 | 0.04 | 0.05 | 4 | 83 | 0.3 | Descent |
| 0.9 | 0.5 | 0 | 0 | 0.04 | 0.06 | 4 | 83 | 0.3 | |

Figure 7:
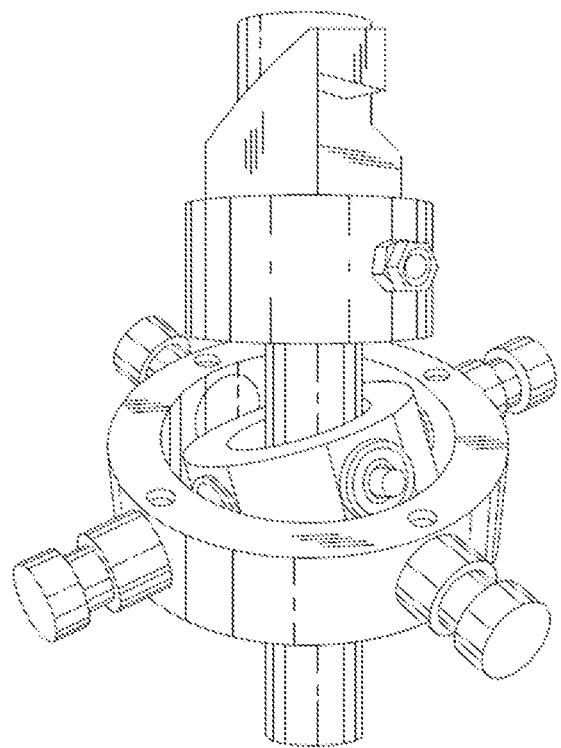
FIG. 7 is a drawing of a rotor hub with gimbal, according to one embodiment.

The hub allowed the rotors to tilt freely along the roll and pitch axes to improve the stability of the UAV device during flight. The freedom of the rotors to tilt ensures that the payload hangs substantially vertically regardless of minor disturbances from the air, thus providing stability for the range (LiDAR) scanner to perform a substantially horizontal scan. A drawing of the gimbal hub is shown in FIG. 7. The hub was designed to connect to a spin release mechanism (described below including a stationary motor to spin the device up to its autorotative speed and then release it.

Spin Release Mechanism

Figure 8E:
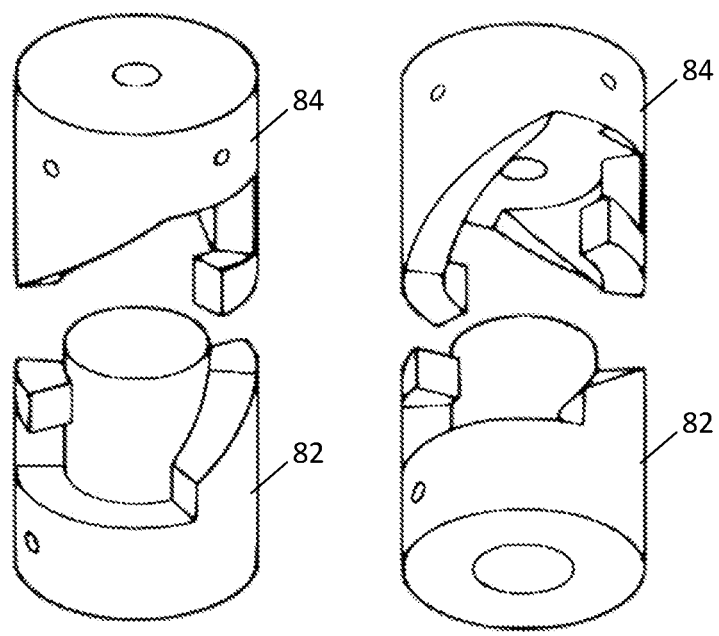

Acceleration of the UAV device rotor and release of the device was controlled using a spin release mechanism. The spin release mechanism was implemented using the following main components: Arduino Uno microcontroller, Cytron MDD10A motor controller, Airpax 12V DC motor with encoder, potentiometer, push button switch, and 12V battery. A mechanical clutch as shown in FIGS. 8A-8E was mechanically connected between the motor and the rotor hub of the device via respective top 84 and bottom 82 sections. In FIG. 8A the bottom 82 and top 84 sections are fully engaged and rotate together. In FIG. 8B the top 84 stops rotating and the bottom 82 continues to rotate, causing the bottom section to begin to be released. In FIG. 8C the two sections continue to separate, and in FIG. 8D the bottom section 82 continues to rotate and is released from the top section 84.

The microcontroller was used to control the voltage sent to the motor and to display the encoder values on a computer screen. The potentiometer provided manual control of the speed of the motor. A push button was used to stop the rotation of the motor. When the button is pushed once a desired angular velocity is reached, the motor quickly stops rotating and the bottom section 82 of the mechanical clutch releases from the top half due to its angular momentum (see FIG. 8D). FIG. 8E shows two views of the clutch with the two sections fully separated.

Payload

Based on the design of this embodiment, in order to effectively gather 3D point cloud data the payload must achieve the following:

Measure its vertical position during flight;

Measure its angular position during flight;

Obtain LiDAR data about its environment (e.g., cavity walls within a specified distance);

Data must be retrievable after the descent is complete; and,

Weigh less than approximately 0.5 kg.

The payload included a custom-configured Arduino™-based data acquisition system (DAQ) with various sensors for recording position and range data. The DAQ system included an accelerometer, a gyroscope, a horizontal facing range sensor, and a vertical facing range sensor. The vertical position of the device was monitored by using the vertical range sensor and the integration of the accelerometer data. The angular position was monitored by integrating the gyroscope data. The surrounding environment is scanned using the horizontal facing rangefinder as the device rotates and descends. The sensor data was collected on a retrievable micro SD card. The payload housing was made out of carbon fibre shell with foam inside. A pour-in-place expanding foam was used to create a mold for the electronics. These materials were selected to reduce the mass of the device and protect the electronics upon impact. The payload is shown in FIG. 7.

EXAMPLE 2

Testing

The UAV device prototype was tested in a laboratory environment to determine if the device would exhibit autorotation, if it could withstand landing impact and allow for the retrieval of data, and whether a 3D point cloud of the environment (i.e., cavity) could be constructed from the collected data.

Experimental Set Up and Procedure

A boom was used to position the UAV device at the top and center of a cavity, which was a five meter high overhang in a building. The spin release mechanism was attached to the end of the boom.

The UAV device was deployed twice. The first test involved rotating the device at a low angular velocity (2100 deg/s) before release. This was to test the release mechanism attached to the extended boom. In the second deployment the UAV device was rotated at the full capacity of the motor (3300 deg/s) before release. (The motor used did not have enough torque to spin the device to the desired autorotative angular velocity of 9052 deg/s.)

It was observed that the UAV device descended substantially vertically, and there was no significant external damage upon impact. The gimbal hub proved its ability to stabilize the device and prevent horizontal translation during flight. The choice of materials proved suitable for the application. The impact strength of the carbon fibre payload housing prevented fracture and the pour-in-place foam demonstrated its ability to absorb energy and prevent damage to the inner electronics. The ability of the rotor blades to rotate in place upon landing contributed to preventing damage to the blades. There was no damage to the payload electronics, which allowed for the retrieval of data acquired by the DAQ system.

Figure 9A:
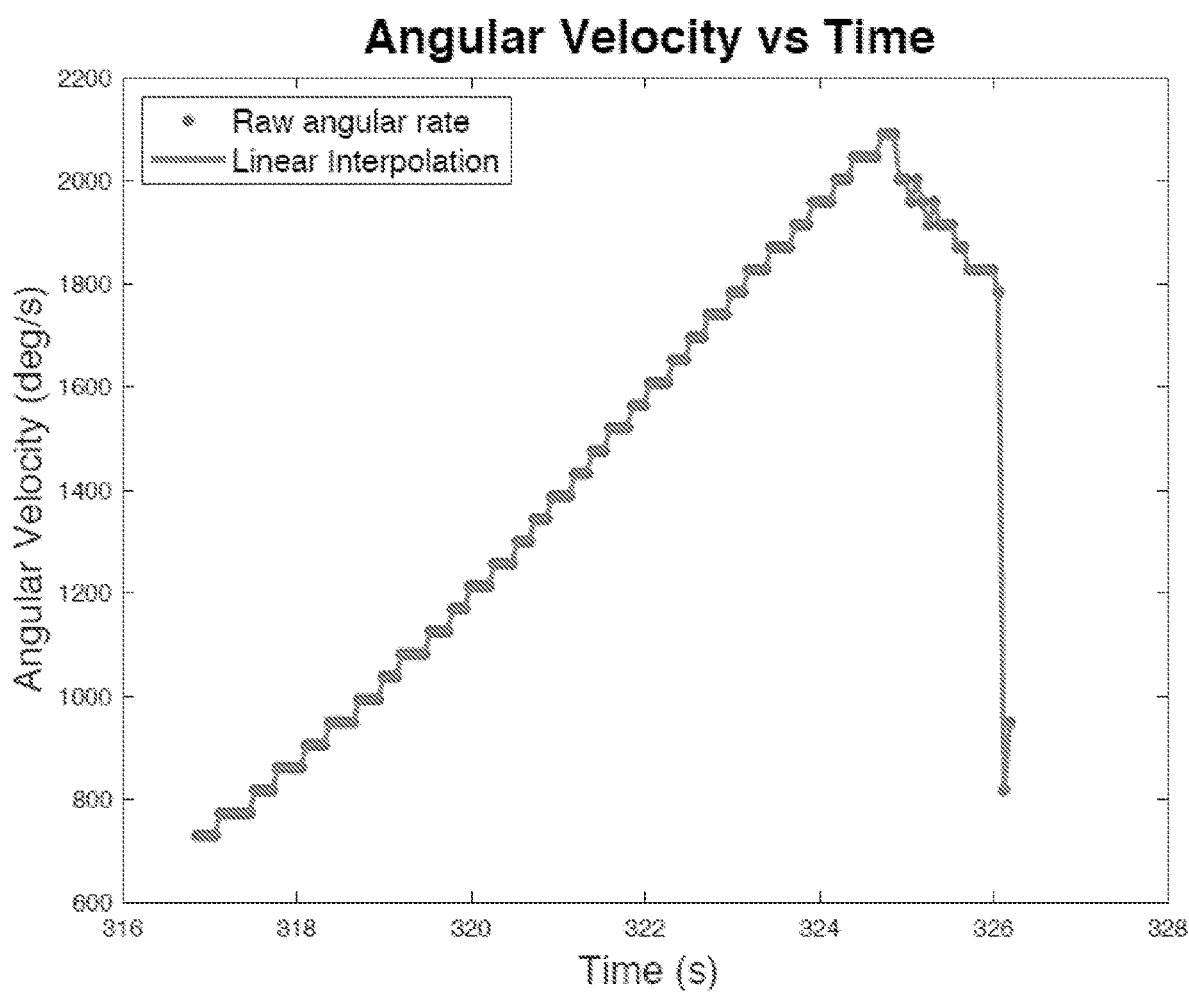
FIGS. 9A and 9B are plots showing UAV gyroscope data collected from a first deployment with starting angular velocity of 2050 deg/s and a second deployments with starting angular velocity of 3250 deg/s, respectively, for the prototype UAV of FIG. 6.
Figure 9B:
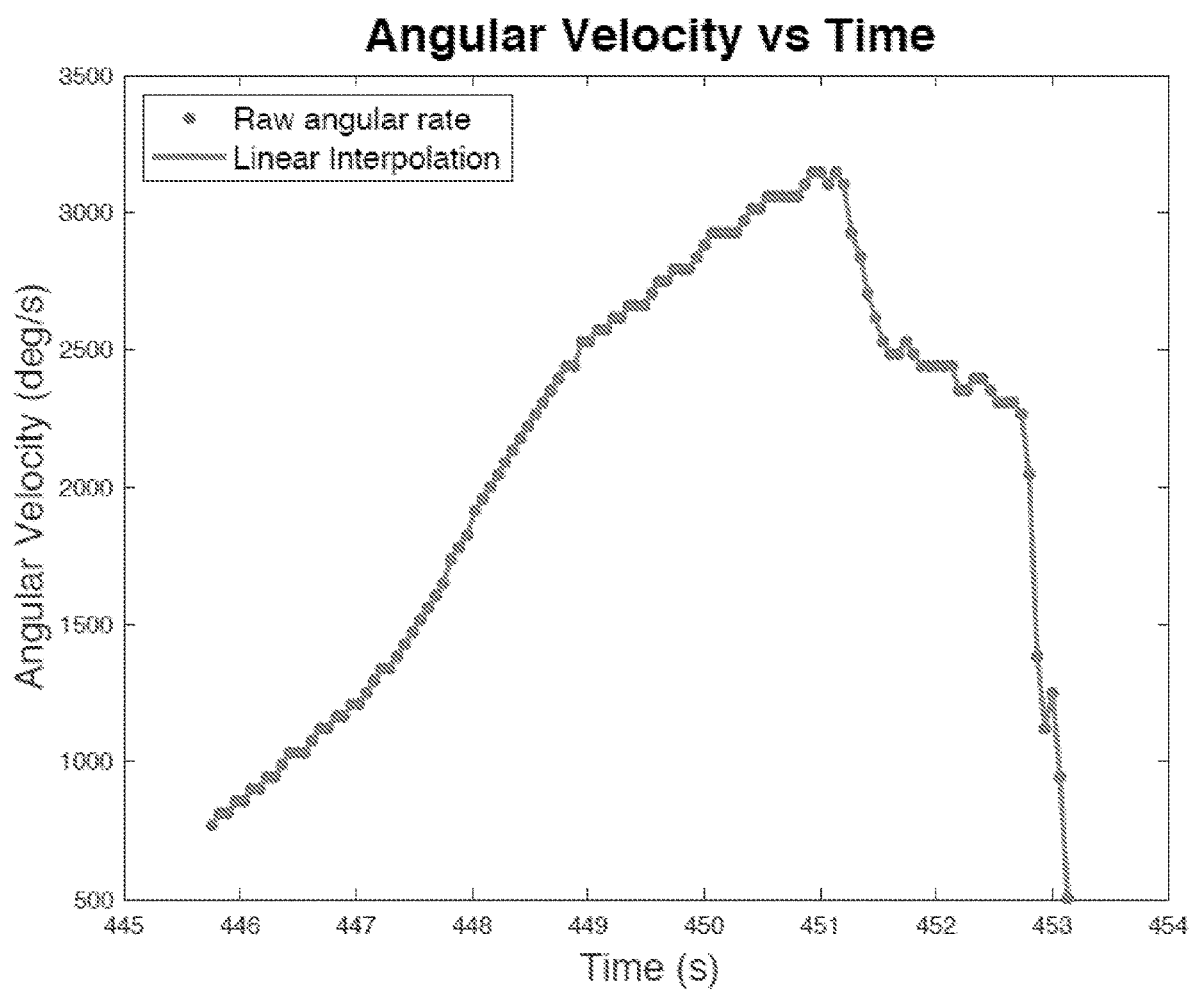

FIG. 9A shows the gyroscope data collected from the first deployment. It shows that the device was accelerated to an angular velocity of 2050 deg/s and then released. The angular velocity decreased from 2050 to 1800 deg/s as the device descended and stopped upon hitting the floor. FIG. 9B shows the gyroscope data collected from the second deployment when the device was spun to an angular velocity of 3250 deg/s and then released. This graph shows that the action of releasing the device greatly reduced the angular velocity to about 2500 deg/s before the device entered a phase of freely descending. As the device descended the angular velocity reduced from 2500 to 2300 deg/s before hitting the floor. Neither figure shows that the angular velocity started to increase towards the predicted equilibrium angular velocity.

Figure 10A:
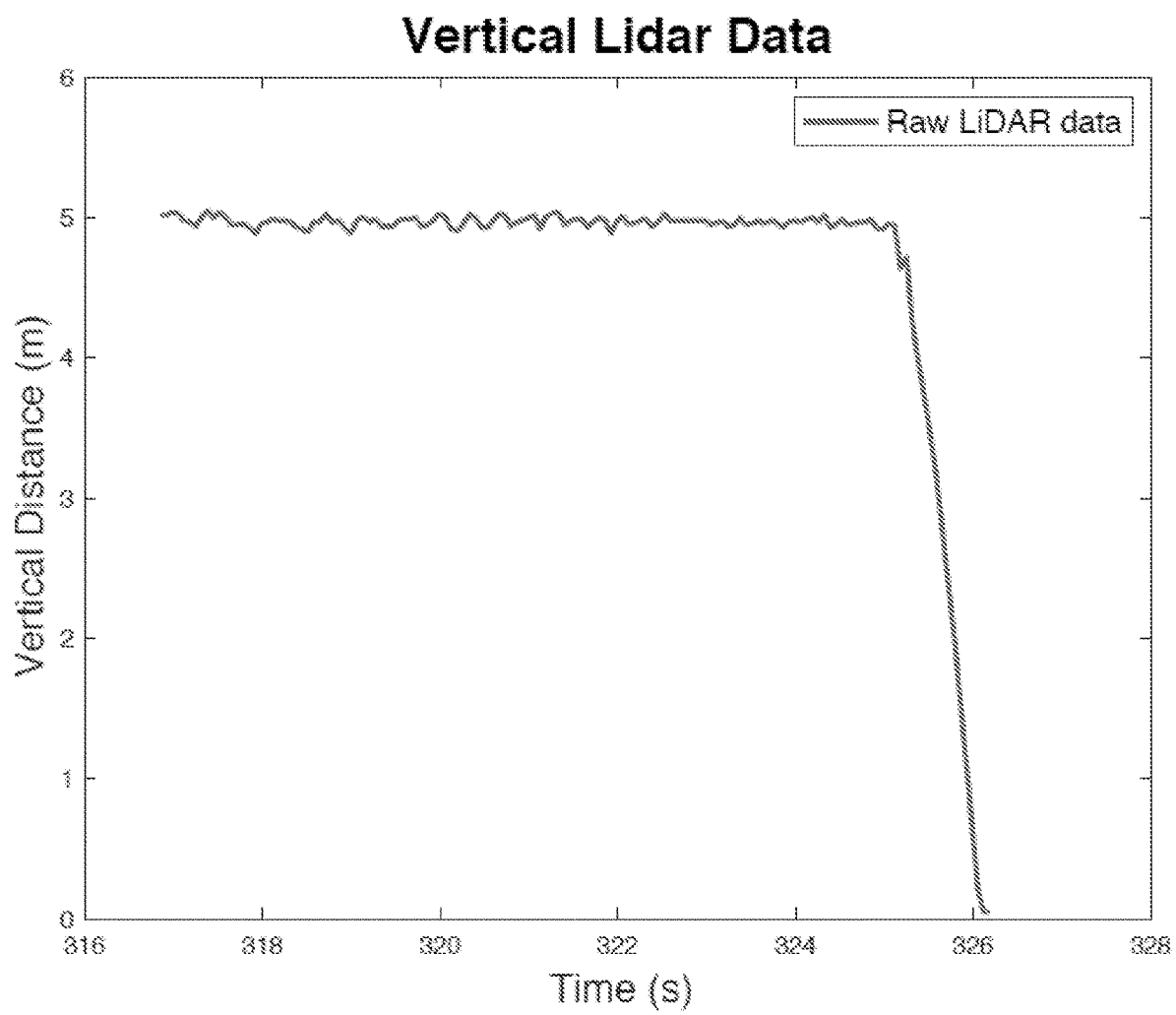
FIGS. 10A and 10B show vertical LiDAR data collected during the first and second deployments, respectively, for the prototype UAV of FIG. 6.
Figure 11A:
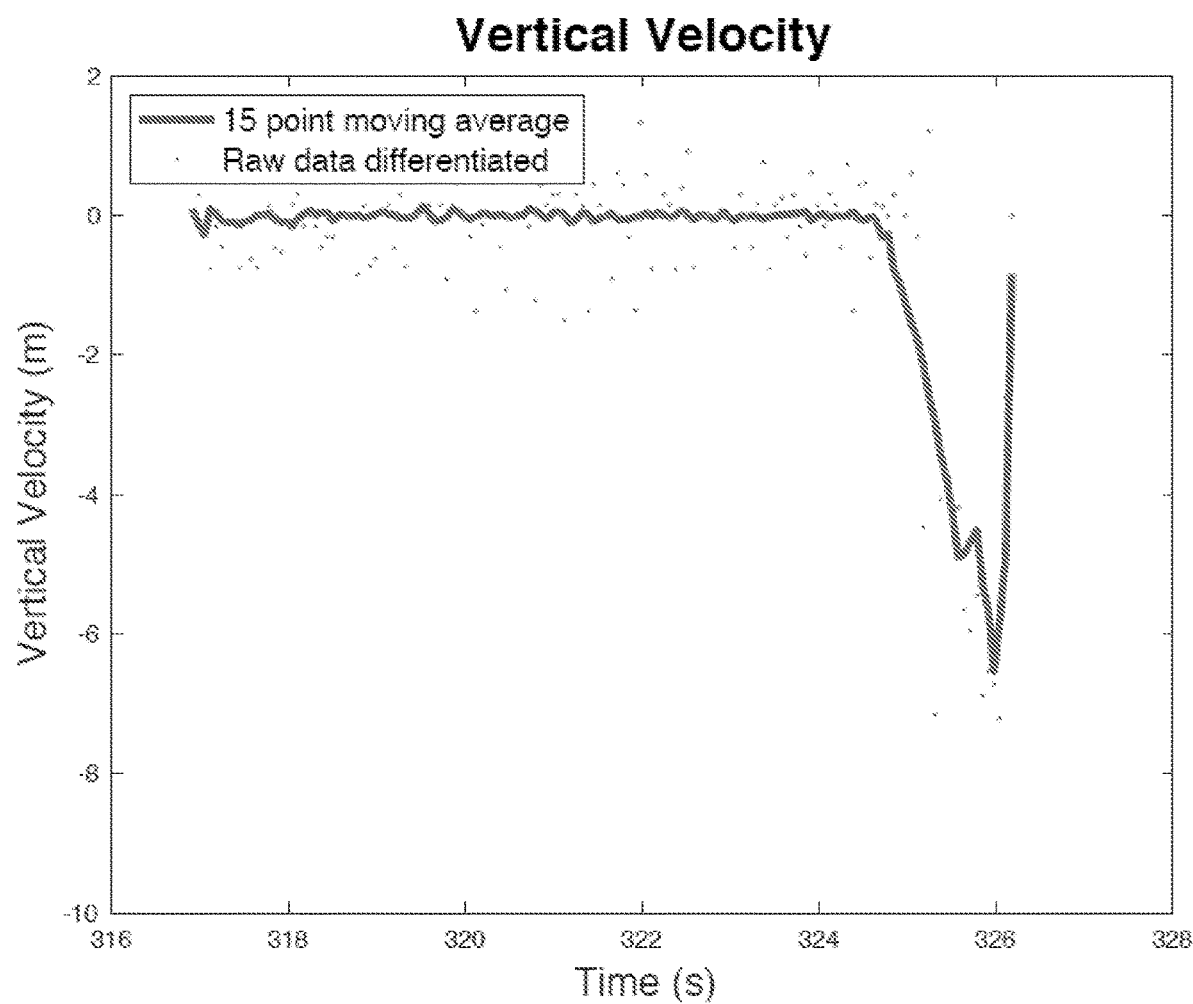
FIGS. 11A and 11B show differentiated LiDAR data for the first and second deployments, respectively, for the prototype UAV of FIG. 6.

FIG. 10A shows vertical LiDAR data collected during the first deployment. The LiDAR data shows the device descended for 0.9 s and displayed a non-linear decrease in vertical position. This data has been smoothed using a 15 point moving average and then differentiated using the equation $$V_d = \frac{d_2 - d_1}{t} \qquad (2)$$

where $d_1$ is the initial vertical position, $d_2$ is the second position and t is the time step. FIG. 11A shows the results of the differentiation and confirms the UAV device accelerated downwards throughout its descent reaching a final velocity of −6.5 m/s before hitting the floor.

Figure 10B:
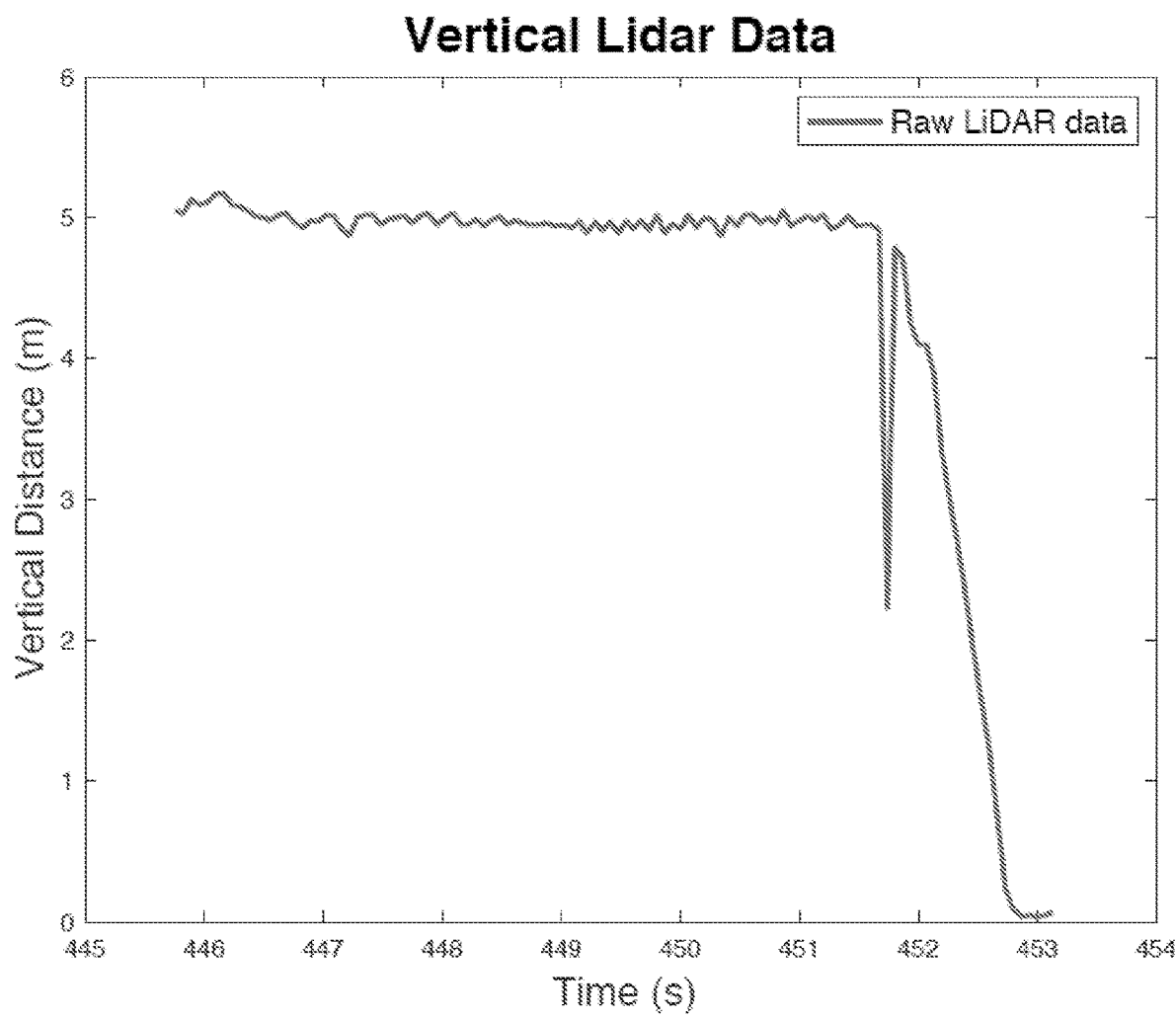
Figure 11B:
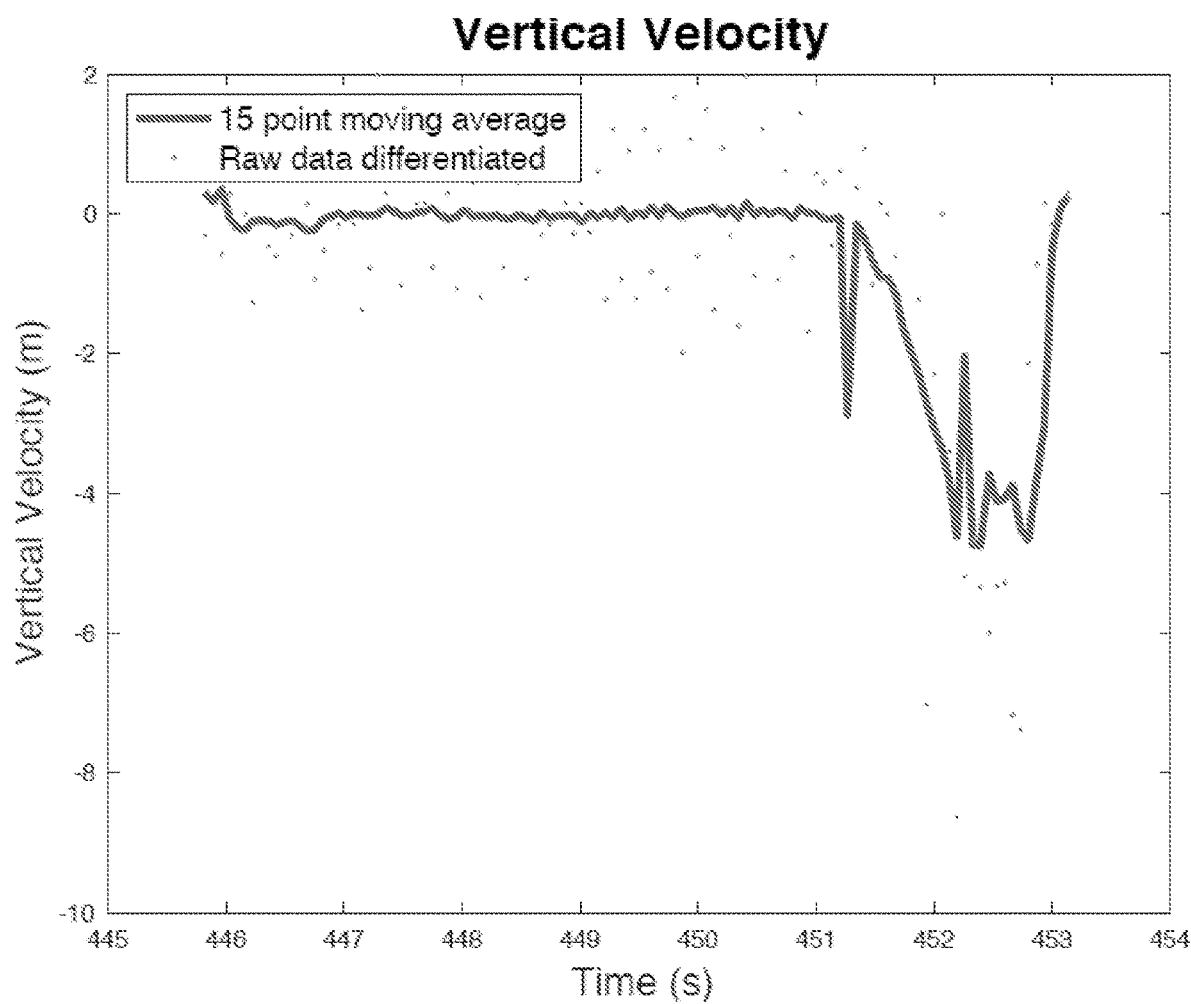

FIG. 10B shows the vertical LiDAR data collected during the second deployment. The device descended for 1.1 s and displayed a non-linear decrease in vertical position. The differentiated data is shown in FIG. 11B. The smoothed result shows that the average descent velocity during flight was 4 m/s. This is significantly less than the descent velocity during the first deployment, and these results demonstrate that as the angular velocity of the device increases, the descent velocity decreases.

The X and Y accelerometer data were not used to make conclusions about the UAV descent because the X and Y axes of the accelerometers are rotating with the device and the X-Y plane is tilted as the payload sways during descent. Accordingly, comparison of the X and Y axes outputs across both deployments did not show any similarities.

The Z axis accelerometer outputs were expected to be constant and 9.8 m/s$^2$ and during free fall the expected output would be 0 m/s$^2$. The data showed that during the first deployment the UAV entered a state of free fall upon release but then began producing lift as the accelerometer reading trended towards m/s$^2$. A moving average determined that the lowest accelerometer reading was 4 m/s$^2$ in the first deployment and 5 m/s$^2$ in the second trial. This means that the rotor was producing more lift in the second deployment.

From these results it is concluded that the UAV did not exhibit equilibrium autorotation during its five meter descent. This may be due to the relatively low height of only 5 in from which it was released, and from the lack of sufficient motor torque available in the spin release mechanism to spin the UAV to its ideal autorotative angular velocity prior to release. It is expected that the UAV would have reached equilibrium autorotation if it had been released from a higher release point.

After post-processing the data collected from each descent, a 3D point cloud of the UAV's surroundings was created. One 3D point cloud was generated from each deployment to compare the effects of angular velocity on the accuracy of the map produced.

A 3D point cloud was generated by plotting collected horizontal range measurements in three dimensional space. At each timestamp (i), the DAQ system sampled the horizontal range sensor for the distance to the cavity wall ($r_i$), the vertical range sensor for the distance to the floor ($z_i$), and the gyroscope ($\Omega_i$) for the angular velocity. The angle rotated by the device at instant i ($\varphi_i$) was determined by integrating previous gyroscope measurements. The position of the cavity wall in relation to the position of the UAV device in three dimensional space was then determined to be $$x_i = r_i \cos(\varphi_i)$$

$$y_i = r_i \sin(\varphi_i)$$

$$z_i = z_i$$

Plotting each sampled measurement of i from 0 to the total number of samples results in a full 3D point cloud of the environment surrounding the UAV during its flight.

Figure 12A:
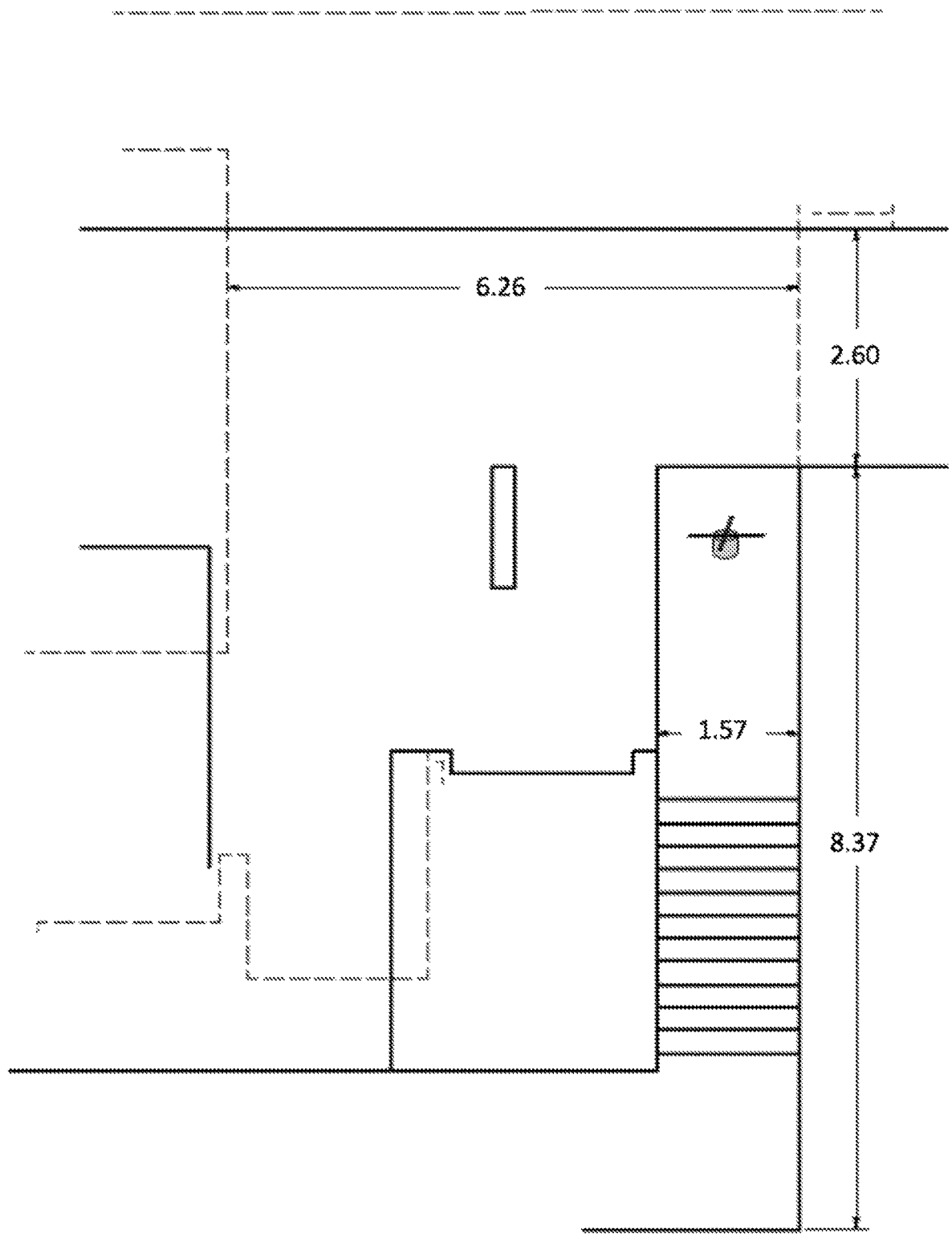
FIG. 12A is a drawing showing a top view of the testing environment.
Figure 12B:
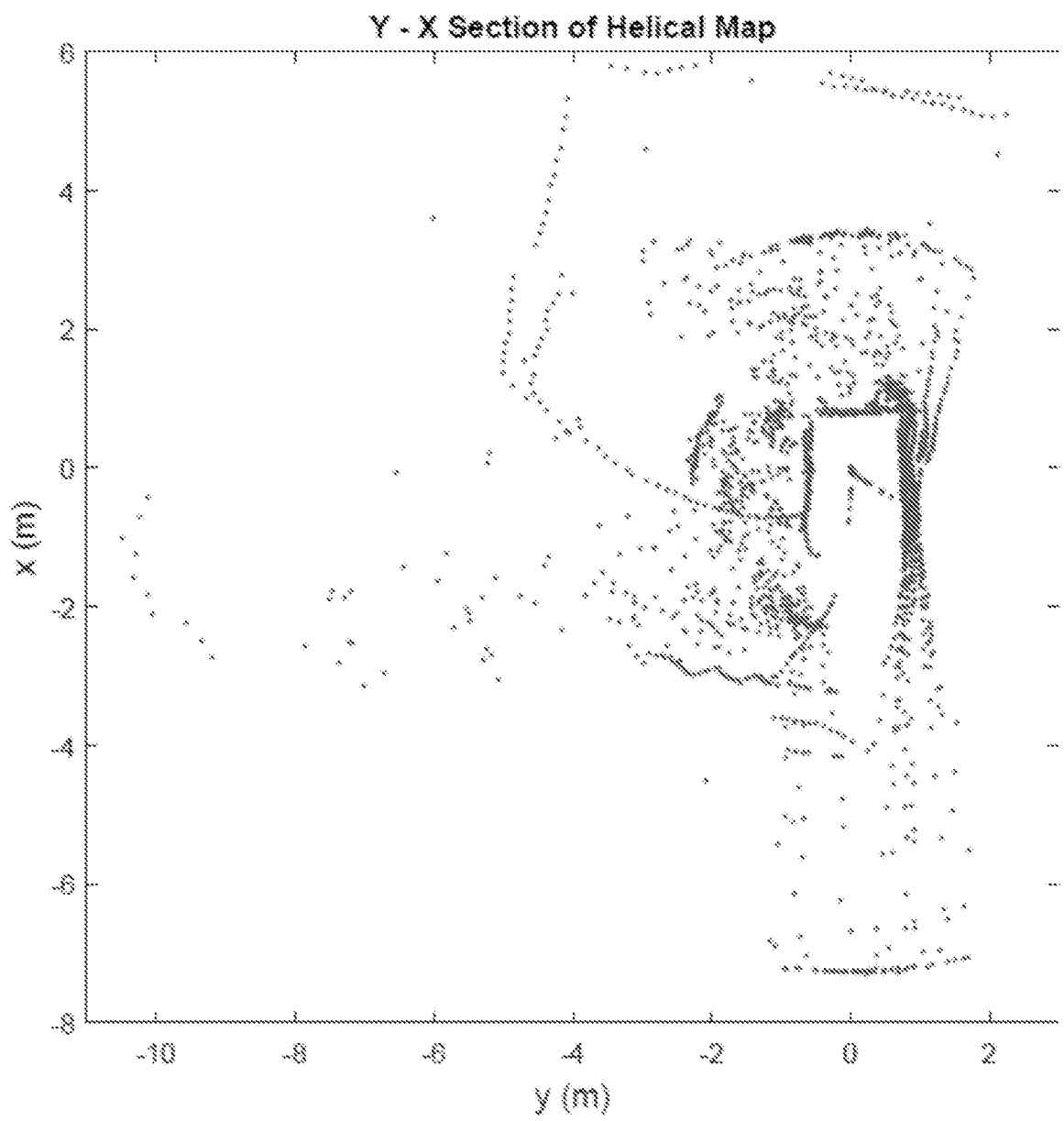
FIGS. 12B and 12C show corresponding top view point clouds for the first and second deployments, respectively, for the prototype UAV of FIG. 6.
Figure 12C:
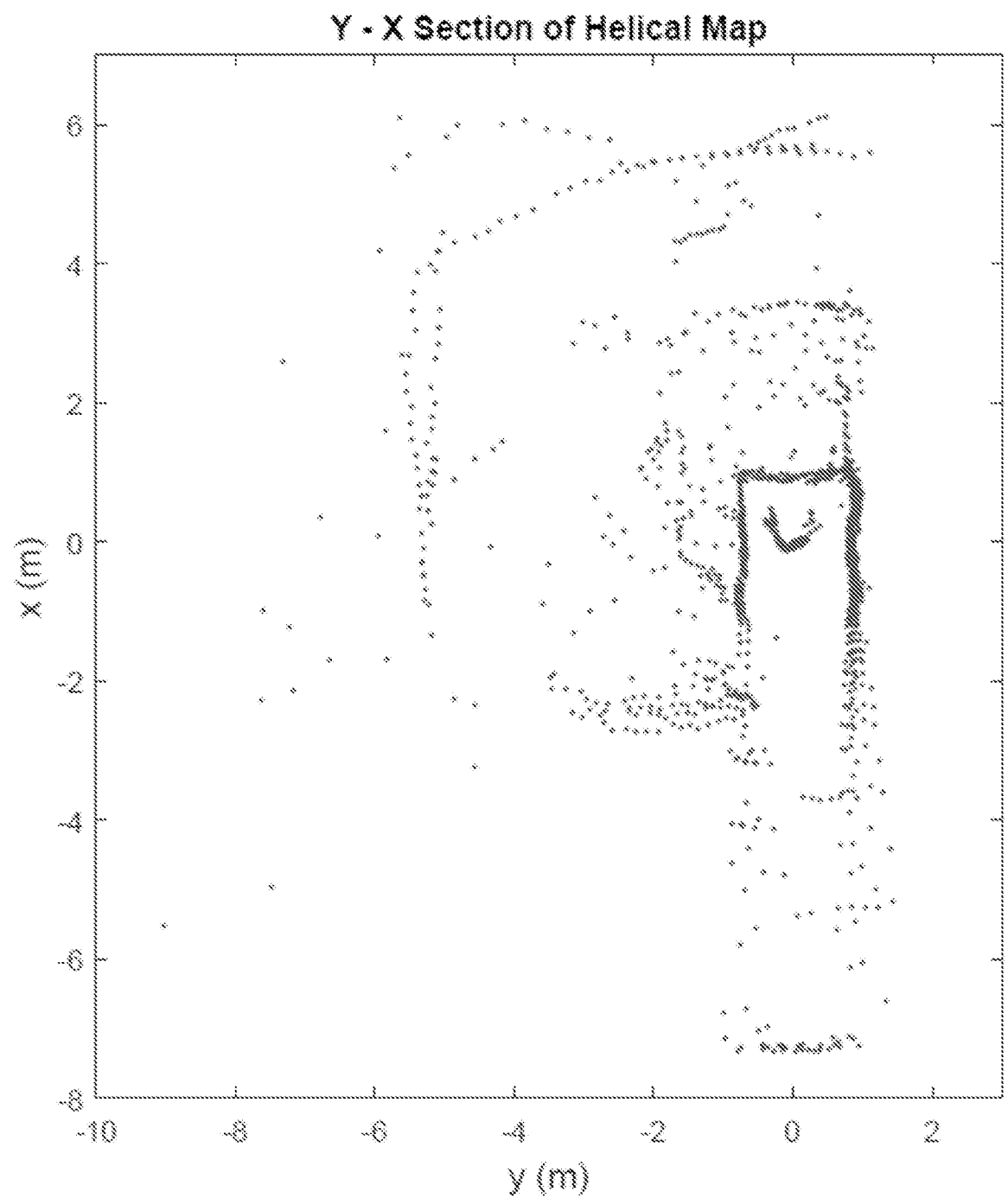

Both deployments resulted in point clouds that fairly accurately resemble the testing environment. From each section view a distinct outline of the environment can be determined and the position of solid walls can be estimated easily. FIG. 12A is a drawing showing a top view of the testing environment. FIGS. 12B and 12C show the corresponding top view point clouds for low and high angular velocity, respectively. Noise in these point clouds is due to various objects in the environment surrounding the UAV during its rotation and descent. Various objects include a railing surrounding the overhang, a hand pallet truck and people watching the experiment. These objects result in the points that do not resemble walls in each map.

Figure 13A:
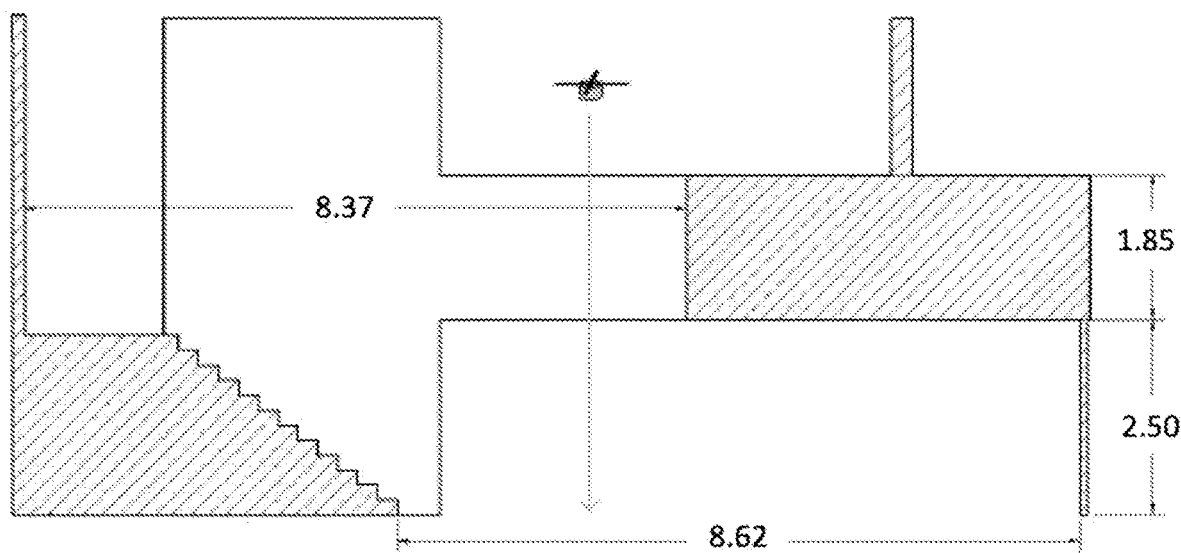
FIG. 13A is a drawing showing a side view of the testing environment.
Figure 13B:
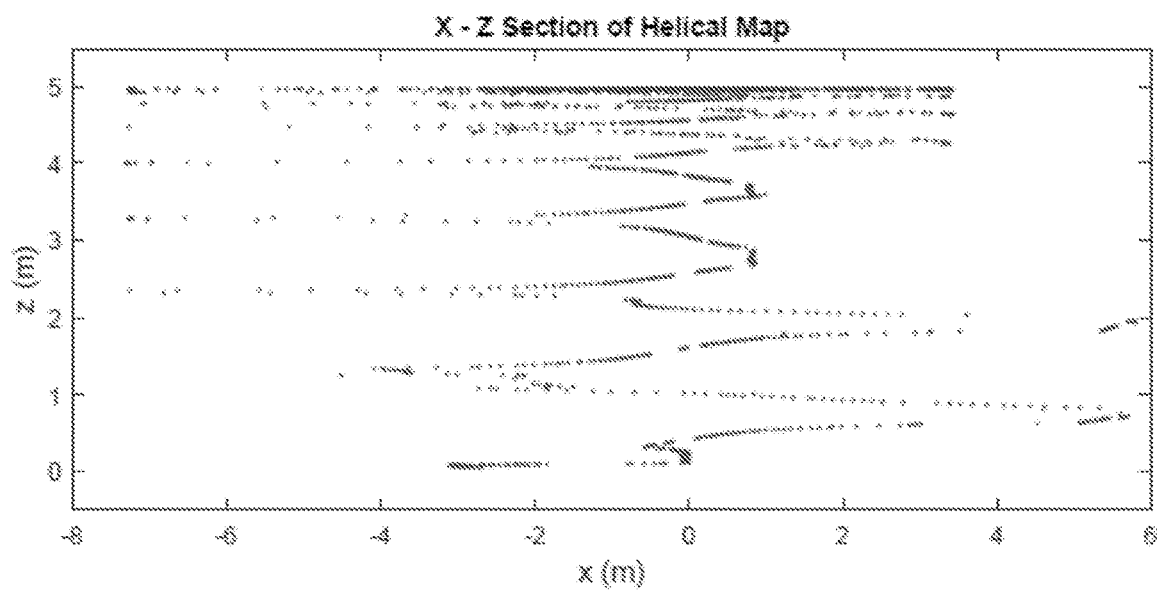
FIGS. 13B and 13C show corresponding side view point clouds for the first and second deployments, respectively, for the prototype UAV of FIG. 6.
Figure 13C:
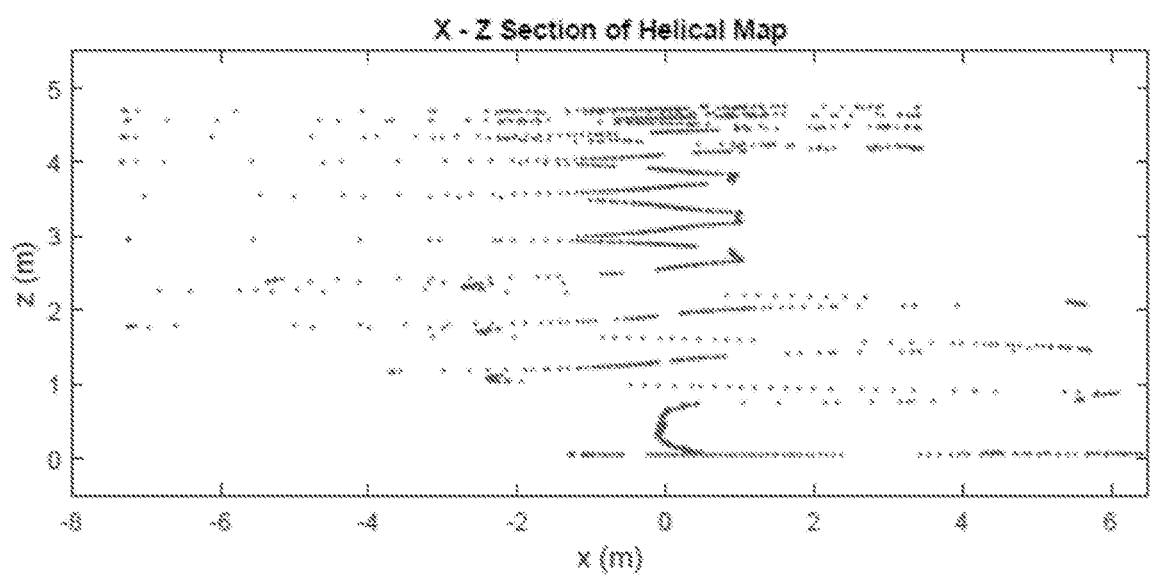

FIG. 13A is a drawing showing a side view of the testing environment. FIGS. 13B and 13C show the corresponding side view point clouds for low and high angular velocity, respectively. The side views point clouds accurately shown an outline of the environment. These views also display the helical pattern generated from the UAV flight pattern. FIG. 13B shows that the helical pitch of the scan pattern was about 70 cm. The pitch changes throughout the scan because the UAV did not exhibit a constant angular velocity. FIG. 13C shows the helical pitch was smaller at about 45 cm when the UAV descended with a higher angular velocity.

Figure 14A:
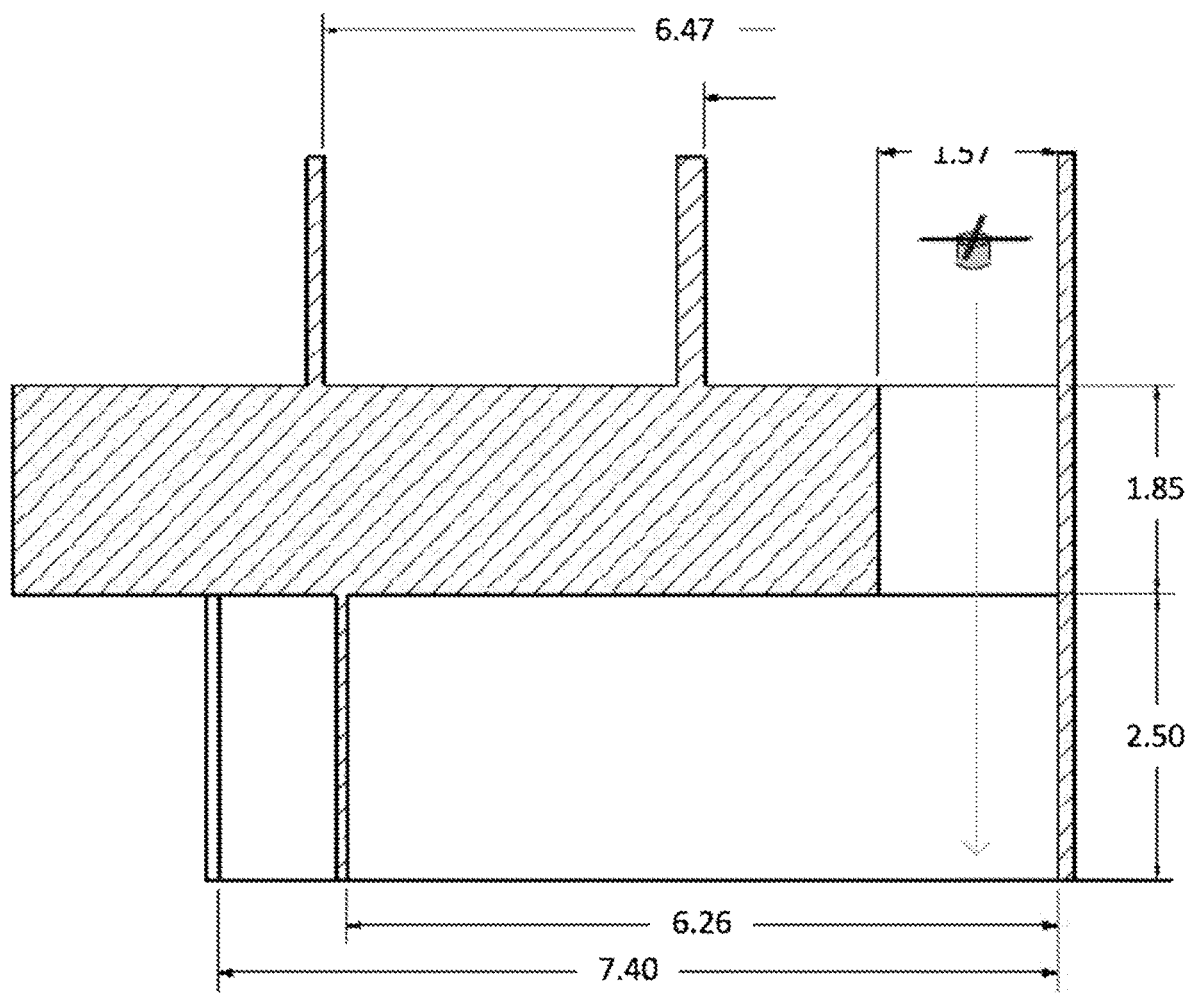
FIG. 14A is a drawing showing a front view of the testing environment.
Figure 14B:
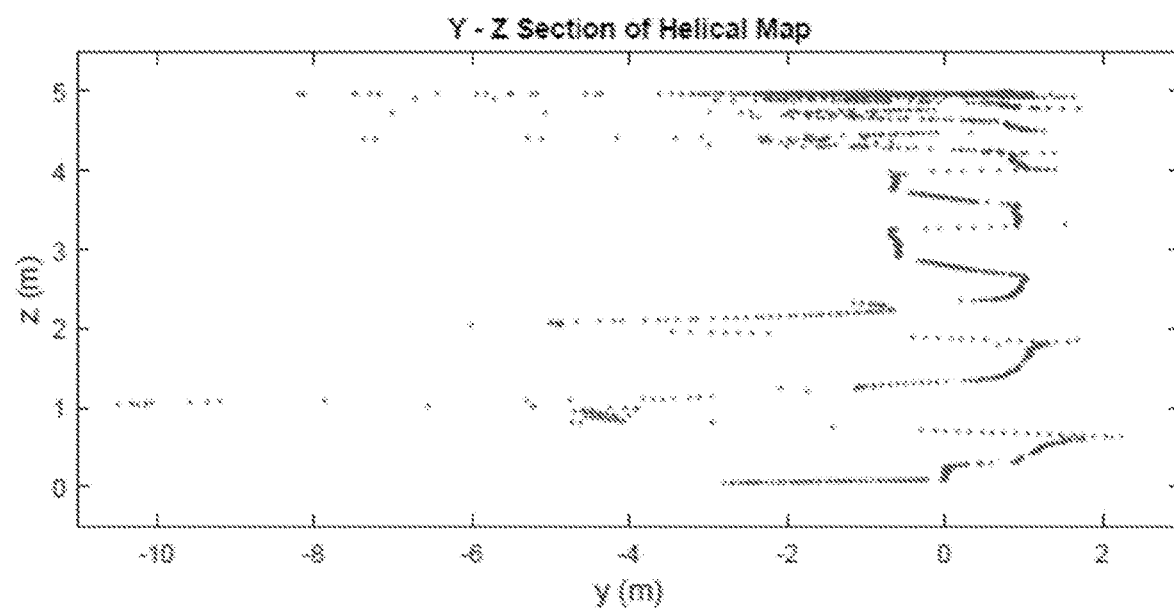
FIGS. 14B and 14C show corresponding front view point clouds for the first and second deployments, respectively, for the prototype UAV of FIG. 6.
Figure 14C:
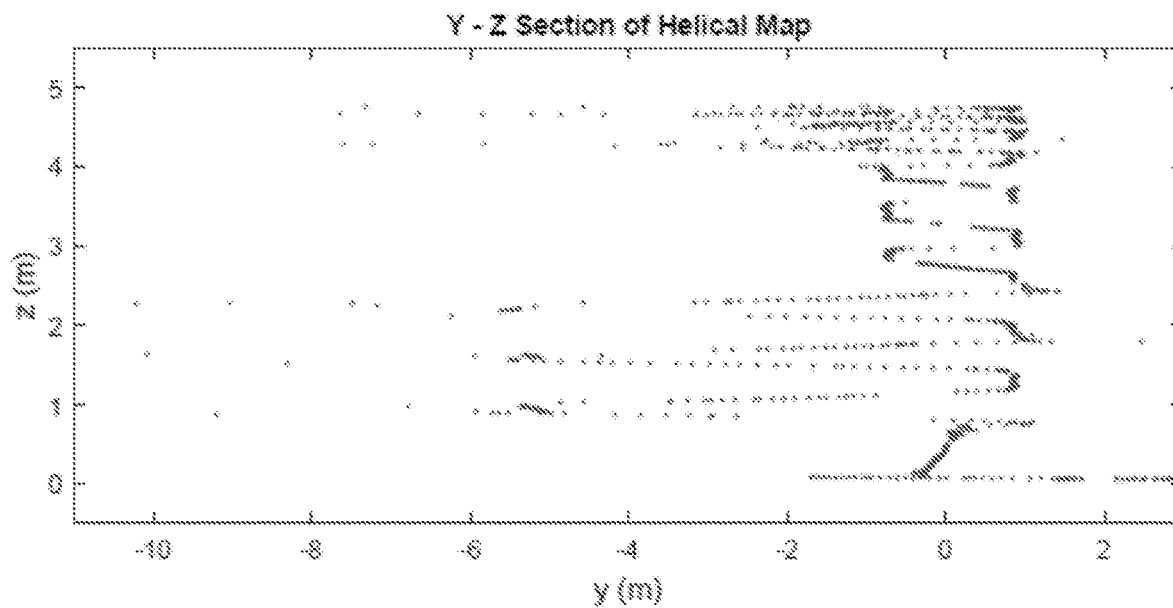

FIG. 14A is a drawing showing a front view of the testing environment. FIGS. 14B and 14C show the corresponding front view point clouds for low and high angular velocity, respectively. The front view point clouds similarly display correct representations of the surrounding environment. These views also demonstrate the helical scan pattern and the pitch dimensions resulting from the different deployment angular velocities.

The data demonstrate that the point clouds generated provide information that can be used to conduct a volume estimate. The point clouds may be subjected to various processing such as filtering outlier range measurements, applying a closed loop mapping algorithm, applying an open loop mapping algorithm, applying a simultaneous localization and mapping (SLAM) algorithm, and/or combining sensor information for more accurate position estimates. Of course, using the most accurate sensors as economically feasible improves the point cloud collected. Overall the results show that the UAV device was capable of autonomously collecting 3D data along the vertical extent of the cavity that can be useful for computing a volume estimate. The results confirm that the design criteria set forth above have been met.

All cited publications are incorporated herein by reference in their entirety.

EQUIVALENTS

While the invention has been described with respect to illustrative embodiments thereof, it will be understood that various changes may be made to the embodiments without departing from the scope of the invention. Accordingly, the described embodiments are to be considered merely exemplary and the invention is not to be limited thereby.

REFERENCES

[1] J. Artieda, et al. Visual 3-D SLAM from UAVs, Journal of Intelligent and Robotic Systems, 55(4):299-321, January 2009.
[2] A. Brindejonc. Design and testing of an autorotative payload delivery system: The autobody, Master's thesis, University of Maryland, College Park, Md., December 2005.
[3] J. Burke. Atmospheric autorotating imaging device. U.S. Pat. No. 4,886,222, December 1989.
[4] J. Chen, et al. Open-pit mining geomorphic feature characterisation. International Journal of Applied Earth Observation and Geoinformation, 42:76-86, 2015.
[5] S. Grzorka, et al. A fully autonomous indoor quadrotor. Robotics, 28(1):90-100, 2012.

[6] W. Johnson. Helicopter Theory. Dover Publications, New York, 1994.
[7] M. Kassecker, et al. Research platform for indoor and outdoor urban search and rescue. Robotics and Automation Magazine, September 2012.
[8] B. Mcknight, et al. Taking flight: UAVs across Barrick. Technical Report 29, Barrick Gold Corporation, 2014.
[9] P. Pounds, et al. Samara: Biologically in-spired self-deploying sensor networks. IEEE Potentials, pages 10-14, 2015.
[10] B. M. Reynolds, et al. Aerial delivery device. U.S. patent application Ser. No. 12/305,018, November 2009.
[11] P. Rudol, et al. Human body detection and geolocalization for UAV search and rescue missions using color and thermal imagery. In: Proceedings of the 2008 IEEE Aerospace Conference, pages 1-8, March 2008.

The invention claimed is:

1. An autorotating unmanned aerial vehicle (UAV), comprising;
    a payload housing that houses a data acquisition system (DAQ);
    a rotor assembly that spins on a single axis, the rotor assembly including two or more rotors and a hub that couples the rotor assembly to the payload housing and allows the rotor assembly to tilt freely along roll and pitch axes of the UAV, the rotor assembly being configured to autonomously control speed and stability of the UAV during passive vertical descent through a cavity;
    wherein each rotor of the two or more rotors has a fixed rotor pitch;
    wherein the DAQ includes one or more sensors that obtain data about motion of the UAV and that sense at least one parameter of the cavity as the UAV descends though the cavity.

2. The UAV of claim 1, wherein at least one sensor obtains data about range to a surrounding structure in the cavity.

3. The UAV of claim 1, wherein the one or more sensors obtain data about position and angular rate of rotation of the UAV, and range to a surrounding structure.

4. The UAV of claim 2, wherein the range to a surrounding structure is used to determine at least one feature of the cavity selected from surface roughness, excavation volume estimation, rock mass stability, ventilation modelling, stope reconciliation, and convergence monitoring.

5. The UAV of claim 1, wherein the at least one parameter is at least one environmental parameter of the cavity.

6. The UAV of claim 1, wherein the hub includes a gimbal that provides the rotor assembly with a selected range of tilt freely along roll and pitch axes of the UAV to improve stability of the UAV during descent.

7. The UAV of claim 1, wherein as the UAV descends and rotates, the one or more sensors perform an approximately helical scan inside the cavity.

8. The UAV of claim 2, wherein the at least one sensor that obtains data about range to a surrounding structure in the cavity comprises a light detection and ranging (LiDAR) system.

9. The UAV of claim 1, wherein the data include vertical position data, angular orientation data, and range data.

10. The UAV of claim 1, wherein the DAQ includes a transmitter for wirelessly transmitting the data.

11. The UAV of claim 1, wherein the one or more sensors comprises at least one of an image capture device, a thermal (infra-red) sensor, an ultra-violet (UV) sensor, an ultrasound (US) sensor, a visible light sensor, a radiation sensor, an air quality sensor, an oxygen sensor, a carbon dioxide sensor, a carbon monoxide sensor, and a chemical sensor that senses at least one chemical of interest.

12. The UAV of claim 1, wherein the cavity is below ground, above ground, natural, or man-made.

13. The UAV of claim 1, wherein the cavity is associated with a mine.

14. A method for mapping one or more parameters of a cavity, comprising:
    deploying an autorotating UAV in the cavity, wherein the UAV comprises a rotor assembly that spins on a single axis, the rotor assembly including two or more rotors and a hub that couples the rotor assembly to a payload housing and allows the rotor assembly to tilt freely along roll and pitch axes of the UAV, the rotor assembly being configured to autonomously control speed and stability of the UAV during passive vertical descent the cavity, and a data acquisition system (DAQ) including one or more sensors that obtain data about motion of the UAV and that sense at least one parameter of the cavity as the UAV descends though the cavity;
    using a processor to process the data and construct a 3D point cloud of the one or more parameter; and
    generating a map of the one or more parameter of the cavity from the 3D point cloud.

15. The method of claim 14, wherein generating a map includes subjecting the 3D point cloud data to one or more of filtering outlier range measurements, a closed loop mapping algorithm, an open loop mapping algorithm, a simultaneous localization and mapping (SLAM) algorithm, and combining sensor information for more accurate position estimates.

16. The method of claim 14, wherein at least one sensor obtains data about range to a surrounding structure in the cavity.

17. The method of claim 14, wherein the one or more sensors obtain data about position and angular rate of rotation of the UAV.

18. The method of claim 16, wherein the range to a surrounding structure is used to determine at least one feature of the cavity selected from surface roughness, excavation volume estimation, rock mass stability, ventilation modelling, stope reconciliation, and convergence monitoring.

19. The method of claim 14, wherein the at least one parameter includes at least one environmental parameter of the cavity.

20. The method of claim 19, wherein the at least one environmental parameter is selected from an image of the cavity interior, temperature, ultra-violet, ultrasound, visible light, radiation, air quality, oxygen, carbon dioxide, carbon monoxide, and at least one chemical of interest.

21. The method of claim 14, wherein the cavity is below ground, above ground, natural, or man-made.

22. The method of claim 14, wherein the cavity is associated with a mine.

* * * * *